United States Patent
Nakajima et al.

(10) Patent No.: US 10,836,343 B2
(45) Date of Patent: Nov. 17, 2020

(54) AIRBAG DEVICE

(71) Applicant: AUTOLIV DEVELOPMENT AB, Vargarda (SE)

(72) Inventors: Yutaka Nakajima, Yokohama (JP); Ryota Ishigaki, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 163 days.

(21) Appl. No.: 15/778,950

(22) PCT Filed: Nov. 28, 2016

(86) PCT No.: PCT/JP2016/085224
§ 371 (c)(1),
(2) Date: May 24, 2018

(87) PCT Pub. No.: WO2017/090772
PCT Pub. Date: Jun. 1, 2017

(65) Prior Publication Data
US 2018/0354447 A1 Dec. 13, 2018

(30) Foreign Application Priority Data

Nov. 26, 2015 (JP) ................................. 2015-230687
Jul. 15, 2016 (JP) ................................. 2016-140837

(51) Int. Cl.
*B60R 21/233* (2006.01)
*B60R 21/231* (2011.01)
(Continued)

(52) U.S. Cl.
CPC .......... *B60R 21/233* (2013.01); *B60R 21/203* (2013.01); *B60R 21/205* (2013.01);
(Continued)

(58) Field of Classification Search
CPC .............. B60R 21/2334; B60R 21/233; B60R 2021/23308; B60R 2021/23324; B60R 21/203; B60R 2021/23332
(Continued)

(56) References Cited

U.S. PATENT DOCUMENTS 3,752,501 A * 8/1973 Daniel .................. B60R 21/233
    280/729
4,828,286 A * 5/1989 Fohl ...................... B60R 21/203
    280/728.2
(Continued)

FOREIGN PATENT DOCUMENTS

| JP | H01132444 A | 5/1989 |
| JP | H02283545 A | 11/1990 |

(Continued)

OTHER PUBLICATIONS

International Search Report of PCT/JP2016/085224, dated Dec. 27, 2016.

*Primary Examiner* — Ruth Ilan
(74) *Attorney, Agent, or Firm* — Dickinson Wright PLLC

(57) ABSTRACT

An airbag device 100 includes: an inflator 112 that is provided in a vehicle and capable of supplying gas; and an outer bag 114 that inflates, by using the gas, in a prescribed shape in front of an occupant 134 sitting in a seat 102 of the vehicle. The outer bag 114 includes an outside base fabric 122 forming an outer surface thereof, an opening part 126 provided in a prescribed area of the outside base fabric 122, and an inside base fabric 124 forming an inner peripheral surface thereof recessed in a concave shape from the opening part 126 and inflating so as to protrude partially from the opening part 126 to a side of the seat. In the airbag device 100, the inside base fabric 124 has lower tension than the outside base fabric 122 and restrains the occupant 134.

12 Claims, 17 Drawing Sheets

(51) Int. Cl.
  *B60R 21/2338* (2011.01)
  *B60R 21/205* (2011.01)
  *B60R 21/203* (2006.01)

(52) U.S. Cl.
  CPC ........ *B60R 21/231* (2013.01); *B60R 21/2338* (2013.01); *B60R 2021/23107* (2013.01); *B60R 2021/23169* (2013.01); *B60R 2021/23308* (2013.01); *B60R 2021/23324* (2013.01); *B60R 2021/23332* (2013.01); *B60R 2021/23382* (2013.01)

(58) Field of Classification Search
  USPC ........................................................ 280/731
  See application file for complete search history.

(56) References Cited

U.S. PATENT DOCUMENTS

| | | | | |
|---|---|---|---|---|
| 5,253,892 A | * | 10/1993 | Satoh | B60R 21/233 280/731 |
| 5,529,337 A | * | 6/1996 | Takeda | B60R 21/233 280/729 |
| 6,042,147 A | * | 3/2000 | Nishijima | B60R 21/217 280/731 |
| 6,554,317 B2 | * | 4/2003 | Lorenz | B60R 21/2342 280/743.1 |
| 6,588,798 B2 | * | 7/2003 | Bohn | B60R 21/203 280/729 |
| 7,108,282 B2 | * | 9/2006 | Hasebe | B60R 21/233 280/743.1 |
| 7,246,820 B2 | * | 7/2007 | Marotzke | B60R 21/217 280/731 |
| 7,631,895 B2 | | 12/2009 | Killiske et al. | |
| 7,832,761 B2 | * | 11/2010 | Shimazaki | B60R 21/201 280/728.1 |
| 9,694,782 B2 | * | 7/2017 | Nagatani | B60R 21/203 |
| 2002/0084638 A1 | * | 7/2002 | Neupert | B60R 21/2342 280/743.1 |
| 2003/0047922 A1 | * | 3/2003 | Ford | B60R 21/216 280/731 |
| 2003/0218325 A1 | * | 11/2003 | Hasebe | B60R 21/2338 280/743.2 |
| 2006/0151976 A1 | * | 7/2006 | Abe | B29C 48/51 280/729 |
| 2007/0024035 A1 | * | 2/2007 | Yamachi | B60R 21/21656 280/731 |
| 2008/0203710 A1 | | 8/2008 | Killiske et al. | |
| 2009/0091107 A1 | * | 4/2009 | Shimazaki | B60Q 5/003 280/731 |
| 2017/0057453 A1 | * | 3/2017 | Morris | B60R 21/203 |
| 2018/0001863 A1 | * | 1/2018 | Nakanishi | B60R 21/205 |

FOREIGN PATENT DOCUMENTS

| | | |
|---|---|---|
| JP | H04212651 A | 8/1992 |
| JP | H1081191 A | 3/1998 |
| JP | 2009-505876 A | 2/2009 |
| JP | 2015-024729 A | 2/2015 |

\* cited by examiner (a)

(b)

(a)

(b)

(c)

B-B CROSS SECTION

C-C CROSS SECTION (a)

(b)

(a)

(b)

E-E CROSS SECTION
(a)

F-F CROSS SECTION
(b)

AIRBAG DEVICE

CROSS-REFERENCE TO RELATED APPLICATIONS

This application is a 35 U.S.C. § 371 national phase application of PCT International Application No. PCT/JP2016/085224, filed Nov. 28, 2016, which claims the benefit of priority under 35 U.S.C. § 119 to Japanese Patent Application No. 2016-140837, filed Jul. 15, 2016, and Japanese Patent Application No. 2015-230687, filed Nov. 26, 2015, the contents of which are incorporated herein by reference in their entirety.

FIELD OF THE INVENTION

The present invention relates to an airbag device that restrains an occupant in a case of emergency.

BACKGROUND

In recent years, most vehicles have included airbag devices as standard equipment. The airbag devices are safety devices that operate in a case of emergency such as when vehicles collide with each other, and that receive and protect occupants using airbag cushions that inflate and deploy with gas pressure. As the airbag devices, there have been various types according to installation places or purposes. For example, in order to protect occupants on front seats from shocks in a longitudinal direction, a front airbag is provided at the center of a steering wheel in a driver seat, and passenger airbags are provided in an instrument panel and its peripheral portion in the vicinity of a passenger seat. Besides, in order to protect each occupant in front and rear rows from a side collision and a rollover (transverse turning over) followed by the side collision, a curtain airbag that inflates and deploys along a side window is provided in the vicinity of the roof of a side wall portion, and a side airbag that inflates and deploys on the immediate side of the occupant is provided at the lateral portion of a seat.

The inside of the airbag cushion of each of the various airbag devices is partitioned into a plurality of spaces according to their purposes or installation environments. For example, in an occupant protection device (front airbag) described in Japanese Patent Application Laid-Open No. H01-132444, an airbag cushion is composed of a central airbag 1 on its central side and an outer peripheral airbag 3 on its peripheral side. According to the configuration of the above-mentioned reference, it is described that an occupant can be reliably received since a restraining surface for restraining the occupant is expanded flatly to have a large area.

SUMMARY

Nowadays, it is desirable for the airbag devices to respond to irregular collisions or shocks such as a so-called oblique collision in which shocks from oblique front and rear directions are applied to a vehicle. In a case of the oblique collision, an occupant enters an airbag cushion present on the front side of a seat at an irregular angle such as an oblique direction. In this case, when the head of the occupant comes into contact with the airbag cushion on the front side of the seat, the head may rotate with the neck of the occupant about an axis when seen from above. Since such rotation of a head is likely to become a factor responsible for increasing an injury value of an occupant in terms of the structure of the human body, there has been a demand for efficiently preventing the rotation.

In view of the above problem, the present invention has an object of providing an airbag device capable of efficiently reducing an injury value of an occupant in a case of emergency.

In order to solve the above problem, the representative configuration of an airbag device according to the present invention includes: an inflator that is provided in a vehicle and capable of supplying gas; and an outer bag that inflates, by using the gas, in a prescribed shape in front of an occupant sitting in a seat of the vehicle, wherein the outer bag includes an outside base fabric forming an outer surface thereof, an opening part provided in a prescribed area of the outside base fabric, and an inside base fabric forming an inner peripheral surface thereof recessed in a concave shape from the opening part and inflating so as to protrude partially from the opening part to a side of the seat, and wherein the inside base fabric has lower tension than the outside base fabric and restrains the occupant.

In the airbag device, the inside base fabric restraining the occupant inflates so as to rise along the opening part from the inside of the opening. Since the inside base fabric inflates so as to protrude from the opening part to the side of the seat, the inside base fabric is closer to the occupant than the outside base fabric. Accordingly, the inside base fabric can come into contact with the occupant at an earlier stage than the outside base fabric.

According to a configuration in accordance with the present invention, in a case in which the opening part is formed in, for example, a round shape when seen from the side of the seat, the inside base fabric also inflates roundly. In addition, in a case in which the opening part is formed in, for example, a linear shape such as a quadrilateral shape, the inside base fabric also inflates along linear sides. Since the inside base fabric inflates along the edge of the opening part, the inside base fabric is present at positions slightly deviated to vertical and horizontal sides with respect to a front side when seen from the occupant in a seated state in a case in which the opening part is, for example, provided so as to face the occupant sitting in the seat.

In a case of an oblique collision or the like, the occupant on a driver seat may move to an obliquely front side in a vehicle width direction. In this case, according to the exemplary configuration, the head of the occupant comes into contact with the inside base fabric present at the positions slightly deviated to the vertical and horizontal sides from the vicinity of the temporal region of the head. Particularly, since the inside base fabric is set to have lower tension than the outer base fabric, the inside base fabric can more softly receive the head. With these configurations, the airbag device makes it possible to reduce the rotation of the head and restrain the head with its injury value further reduced.

The airbag device may further include an inner bag that is provided inside the outer bag so as to be surrounded by the inside base fabric and inflates in a bag shape independently from the outer bag. Since the inside base fabric is supported by the inner bag from the central side of the opening part, a load from the occupant can be further easily absorbed.

In the airbag device, a protrusion amount of the inside base fabric with respect to the outside base fabric may be changeable as a capacity of the inner bag is increased and decreased. For example, the inside base fabric can be further extruded from the opening part to the side of the seat as the capacity of the inner bag is increased. According to the configuration, it becomes possible to adjust the contact degree between the inside base fabric and the occupant.

The airbag device may further include a communication hole that is provided on the inner bag and causes the gas received by the inner bag from the inflator to be discharged therethrough, and the outer bag may be connected to the communication hole and inflate using the gas received through the communication hole. With this configuration, the inner bag can be caused to inflate and deploy prior to the outer bag, and the inside base fabric of the outer bag can be caused to interfere with the inner bag to be further directed to the side of the seat.

The airbag device may further include a band-shaped inner tether that is bridged across at least two places of the outside base fabric inside the outer bag in a state of penetrating the inside base fabric and the inner bag. With the inner tether bridged across inside the outer bag, it becomes possible to adjust gas capacity and the outer shape of the outer bag.

The outer bag and the inner bag may form a driver airbag, and the inner bag and the inside base fabric may restrain a head of the occupant. Since the inside base fabric is particularly set to have lower tension than the outside base fabric, the inside base fabric can further softly receive the head of the occupant on the driver seat. With these configurations, the airbag device makes it possible to reduce the rotation of the head and restrain the head with its injury value further reduced.

The outer bag and the inner bag may form a passenger airbag, and the inner bag and the inside base fabric may restrain a head of the occupant. Since the inside base fabric is particularly set to have lower tension than the outside base fabric, the inside base fabric can further softly receive the head of the occupant on a passenger seat. With these configurations, the airbag device makes it possible to reduce the rotation of the head and restrain the head with its injury value further reduced.

The outer bag and the inner bag may form a knee airbag, and the inner bag and the inside base fabric may restrain a knee of the occupant. When a front collision occurs in the vehicle, the instrument panel or the like of the vehicle tends to move to a vehicle rear side while the occupant tends to move to a vehicle front side through inertia. At this time, since the leg of the occupant may cause moment to rotate in the vehicle width direction about a knee or an ankle, an injury value of the leg is easily increased. In view of the problem, according to the configuration, the leg is received so as to be surrounded by the opening part of the outer bag to be restrained by the inner bag from the vehicle front side. When making an attempt to rotate, the knee is restrained by the inside base fabric in the vehicle width direction. Thus, the airbag device can prevent the rotation of the leg and further reduce an injury value of the occupant.

The opening part may be formed in a rectangular shape having long sides thereof extending in a vehicle width direction, and the inside base fabric may inflate along short sides of the opening part. With this configuration, it becomes possible to more softly restrain the knee in the vehicle width direction and prevent the rotation of the leg with the inside base fabric having low tension.

According to the present invention, it becomes possible to provide an airbag device.

BRIEF DESCRIPTION OF THE DRAWINGS

FIGS. 8(a) and 8(b) are views illustrating a modified example of the cushion illustrated in FIG. 2(b) or the like.

FIGS. 12(a), 12(b) and 12(c) are views of a first modified example of the cushion illustrated in FIG. 9(b) or the like.

FIGS. 14(a), 14(b) and 14(c) are views of a modified example of the cushion illustrated in FIG. 9(b) or the like.

DETAILED DESCRIPTION

Hereinafter, a description will be given in detail of preferred embodiments of the present invention with reference to the accompanying drawings. Dimensions, materials, other specific numerical values, or the like shown in the embodiments are illustrated only for facilitating the understanding of the invention and do not limit the present invention unless otherwise specifically noted. Note that in the present specification and the drawings, elements having substantially the same functions and configurations will be given the same reference signs to omit their duplicated descriptions, and elements not directly associated with the present invention will not be illustrated.

Figure 1:
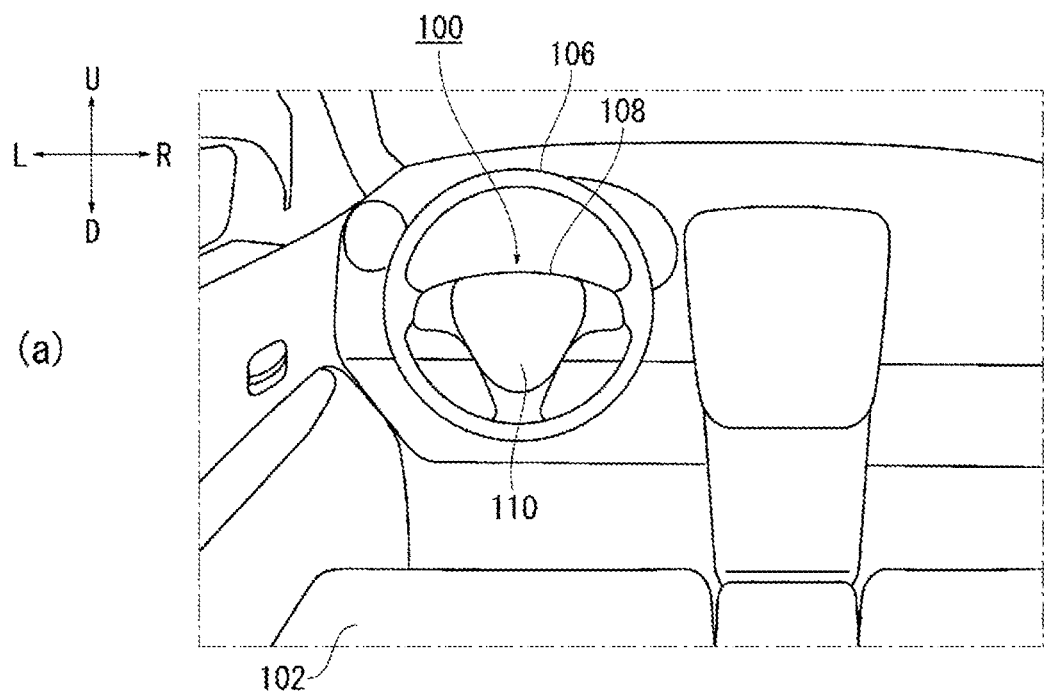
FIGS. 1(a) and 1(b) are views illustrating the outline of an airbag device according to a first embodiment of the present invention.
Figure 1:
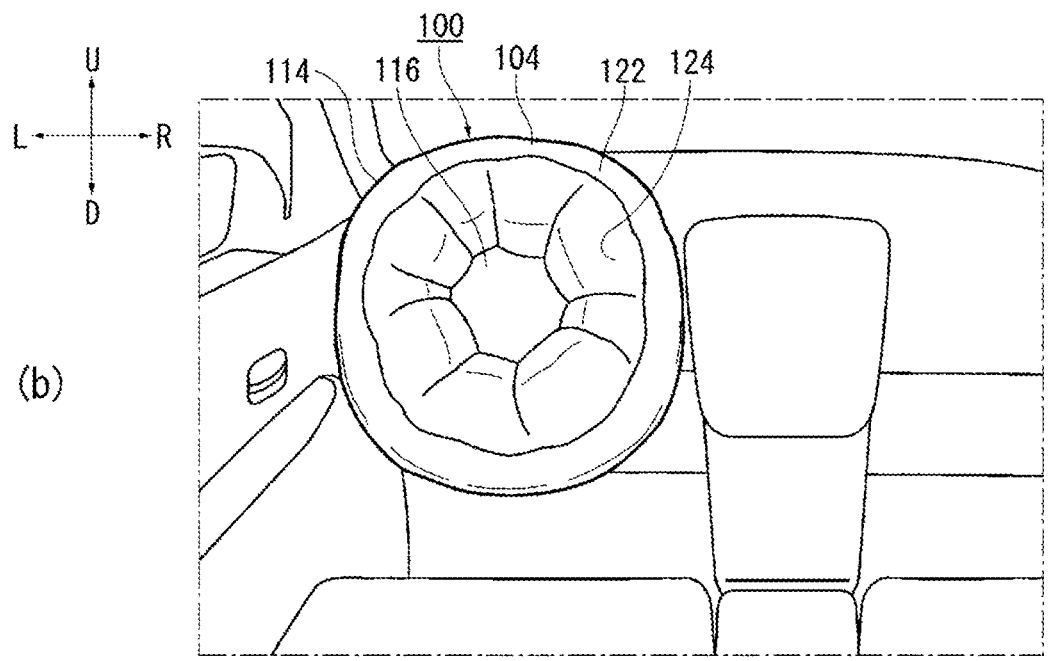

FIG. 1 is a view illustrating the outline of an airbag device 100 according to a first embodiment of the present invention. FIG. 1(a) is a view illustrating a vehicle before the airbag device 100 operates. In FIG. 1(a) and other drawings, the longitudinal direction of the vehicle is illustrated by arrows F (Forward) and B (Back), respectively, left and right sides in a vehicle width direction are illustrated by arrows L (Left) and R (Right), respectively, and the vertical direction of the vehicle is illustrated by arrows U (up) and D (down), respectively.

In the present embodiment, the airbag device 100 is implemented as a driver airbag for a driver seat (front-left seat) in a left-hand steering vehicle. In the following description, a front-left driver seat 102 will be assumed. Therefore, the outside of the vehicle in the vehicle width direction represents the left side of the vehicle, and the inside of the vehicle in the vehicle width direction represents the right side of the vehicle.

An airbag cushion (hereinafter called a cushion 104 (see FIG. 1(b))) of the airbag device 100 is subjected to folding, winding or the like and accommodated in an accommodation part 108 provided at the center of a steering wheel 106. The accommodation part 108 is configured to include a cover 110, a housing (not shown) beneath the cover 110, or the like.

Besides the cushion 104, an inflator 112 (see FIG. 2(b)) serving as a gas generation device is also accommodated in the accommodation part 108. The inflator 112 operates with an impact detection signal transmitted from a sensor not shown and supplies gas to the cushion 104 (see FIG. 1(b)). The cushion 104 starts inflating with the gas from the inflator 112 and performs the tearing, cleavage or the like of the cover 110 with the inflation pressure to inflate and deploy toward the seat 102.

FIG. 1(b) is a view illustrating the vehicle after the cushion 104 of the airbag device 100 has inflated and deployed. As a three-dimensionally inflating bag, the cushion 104 entirely roundly inflates when seen from a vehicle rear side representing a seat side. The cushion 104 is formed by sewing or bonding a plurality of base fabrics pieces constituting its surface together in an overlapped state, cotton spinning using OPW (One-Piece Woven), or the like.

FIGS. 2(a) and 2(b) are views illustrating the cushion 104 during inflation and deployment in FIG. 1(b) from each direction. FIG. 2(a) is a perspective view of the cushion 104 in FIG. 1(b) when seen from a side slightly close to the inside of the vehicle with respect to its facing direction. The cushion 104 in the present embodiment roughly includes the two portions of an outer bag 114 on its outside and an inner bag 116 on its inside.

The outer bag 114 is a portion shaping the major part of the cushion 104 other than the inner bag 116 on a central side. With the gas from the inflator 112 (see FIG. 2(b)), the outer bag 114 roundly spreads and inflates in front of an occupant sitting in the seat 102 (see FIG. 1(b)). Among base fabrics pieces constituting the outer bag 114, an inside base fabric 124 that will be described later inflates so as to protrude toward the seat.

The inner bag 116 is a bag-shaped portion provided on the central side of the cushion 104 and inflates with its periphery surrounded by the outer bag 114. The inner bag 116 also inflates by using the gas from the inflator 112 (see FIG. 2(b)).

FIG. 2(b) is an A-A cross-sectional view of the cushion 104 in FIG. 2(a). The inner bag 116 is formed in a bag shape independently from the outer bag 114 and surrounded by the inside base fabric 124 inside the outer bag 114.

A part of the inflator 112 is inserted in the inner bag 116, and the inner bag 116 directly receives the gas from the inflator 112. In addition, the inner bag 116 is provided with a communication hole 118 through which the gas received from the inflator 112 is to be discharged. The outer bag 114 is connected to the communication hole 118 and inflates by using the gas received through the communication hole 118. The outer bag 114 is provided with a vent hole 120 on the vehicle front side. The gas inside the outer bag 114 is discharged to the outside through the vent hole 120.

The inflator 112 is a disc type and installed inside the accommodation part 108 of the steering wheel 106 (see FIG. 1(a)) of the vehicle with its part inserted in the inner bag 116. Examples of current inflators in widespread use include a type that is filled with a gas generation agent and burns the same to generate gas, a type that is filled with compression gas and supplies the gas without generating heat, a hybrid type that uses both combustion gas and compression gas, or the like. As the inflator 112, any of these types is available.

When seen about the inner bag 116, the inflator 112, or the like, the outer bag 114 is configured to roughly include the outside base fabric 122 forming an outer surface on its outside and the inside base fabric 124 forming an inner peripheral surface on its inside and coming into contact with the inner bag 116. The outside base fabric 122 inflates in a curved shape and is provided with an opening part 126 in its prescribed area on the seat side. The opening part 126 forms the boundary between the outside base fabric 122 and the inside base fabric 124, and a part of the inside base fabric 124 inflates so as to protrude from the opening part 126 to the seat side. The part of the inside base fabric 124 protruding from the opening part 126 has low tension and is effective for softly receiving an occupant to reduce an injury value of the occupant.

Figure 2:
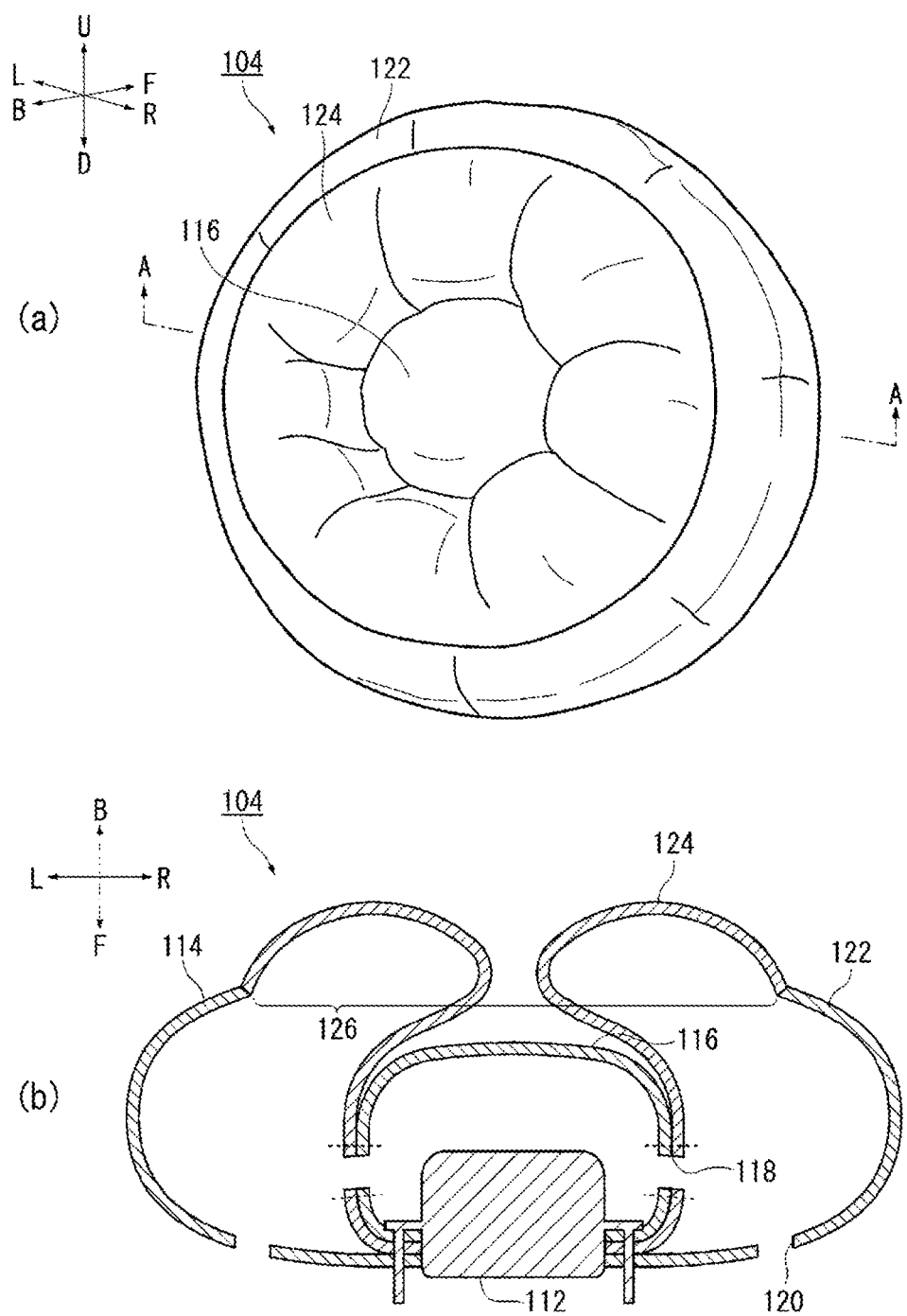
FIGS. 2(a) and 2(b) are views illustrating a cushion during inflation and deployment in FIG. 1(b) from each direction.
Figure 3:
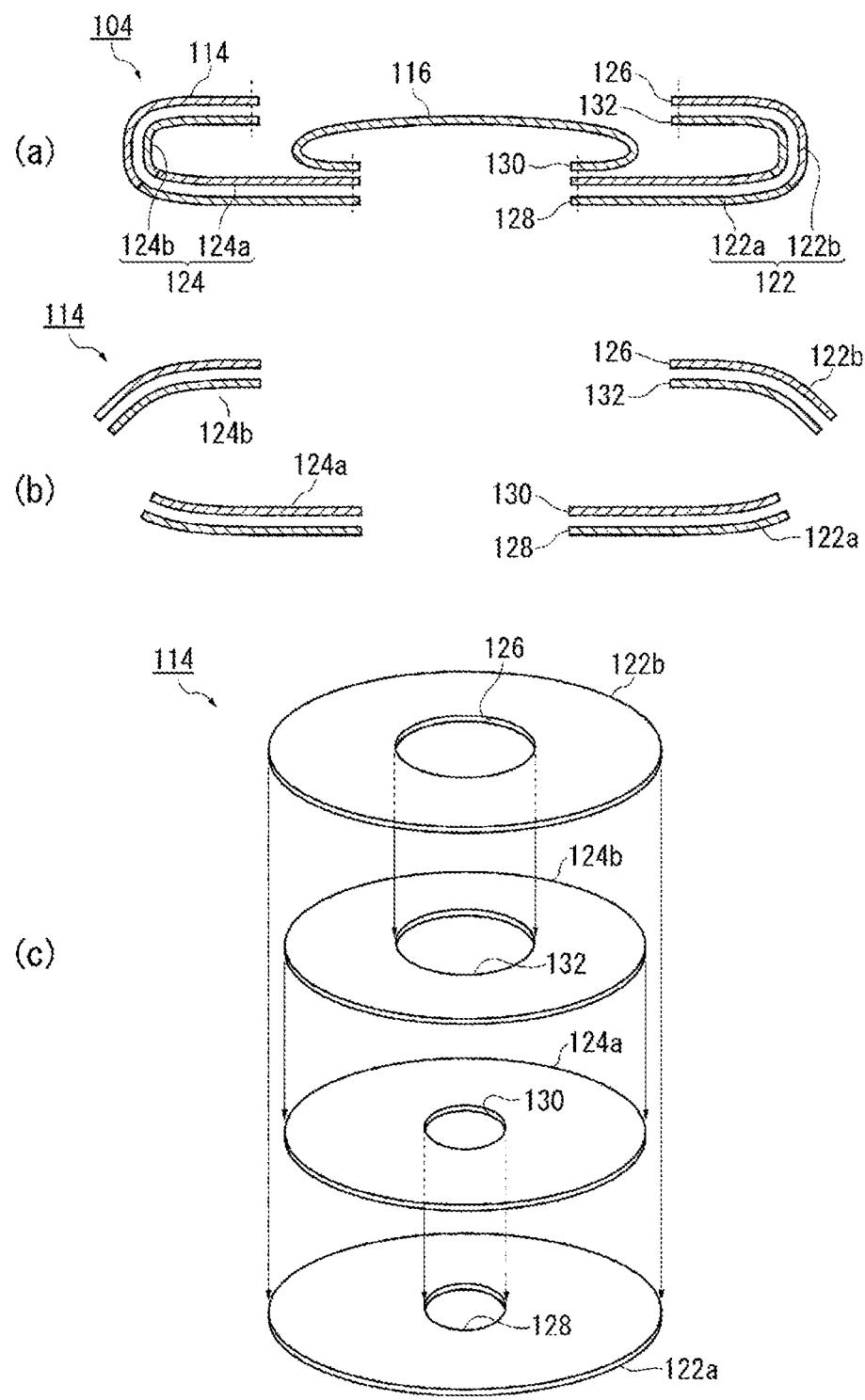
FIGS. 3(a), 3(b) and 3(c) are views of the structure of the cushion about an outer bag in FIG. 2(b).

FIGS. 3(a), 3(b) and 3(c) are schematic views of the structure of the cushion 104 about the outer bag 114 in FIG. 2(b). FIG. 3(a) illustrates a state in which the cushion 104 in FIG. 2(b) has not inflated. The outer bag 114 and the inner bag 116 are connected to each other in the vicinity of a penetration hole 128 for causing the inflator 112 to pass therethrough. The outer bag 114 is so configured that the inside base fabric 124 forms an inner peripheral surface recessed in a concave shape from the opening part 126 with respect to the outside base fabric 122 forming the outer surface.

FIG. 3(b) is an exploded view of the outer bag 114 in FIG. 3(a). By joining a first outside base fabric 122a and a second outside base fabric 122b together and joining a first inside base fabric 124a and a second inside base fabric 124b together, the outside base fabric 122 and the inside base fabric 124 are formed in vase-like shapes of which the openings (opening parts 126 and 132) are narrow and the bodies are expanded as shown in FIG. 3(a).

FIG. 3(c) is a schematic perspective view of each of the base fabrics in FIG. 3(b). As illustrated in FIG. 3(c), the first outside base fabric 122a and the first inside base fabric 124a are provided with circular penetration holes 128 and 130 for causing the inflator 112 to pass therethrough, respectively. In addition, the second outside base fabric 122b and the second inside base fabric 124b are provided with circular opening parts 126 and 132, respectively.

In forming the outer bag 114, the second outside base fabric 122b having the opening part 126 is first joined from above to the outer edge of the first outside base fabric 122a. Similarly, the second inside base fabric 124b having the opening part 132 is joined from above to the outer edge of the first inside base fabric 124a having the penetration hole 130 for causing the inflator 112 to pass therethrough. Then, the opening part 132 of the second inside base fabric 124b and the penetration hole 130 of the first inside base fabric 124a are joined to the opening part 126 of the second outside base fabric 122b and the penetration hole 128 of the first outside base fabric 122a, respectively, to form the outer bag 114 in FIG. 4(a).

Figure 4:
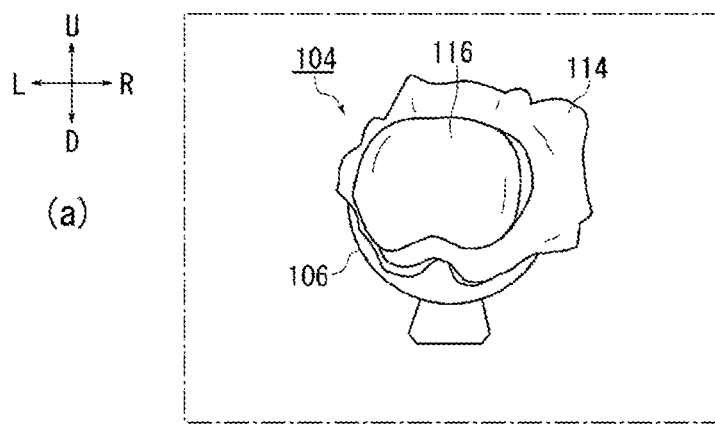
FIGS. 4(a), 4(b) and 4(c) are views illustrating a process in which the cushion in FIG. 3(a) inflates and deploys.
Figure 4:
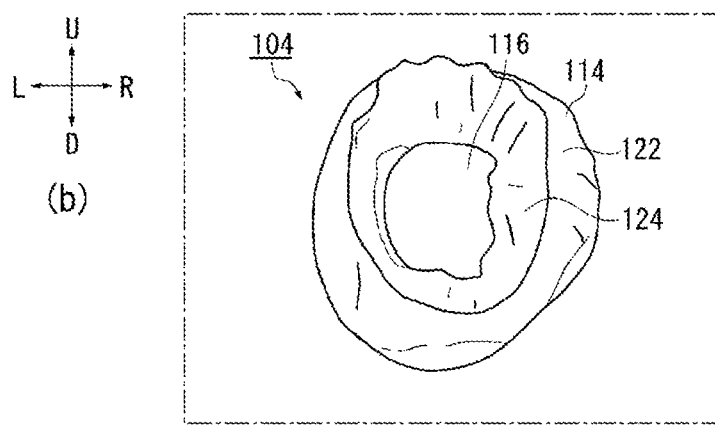
Figure 4:
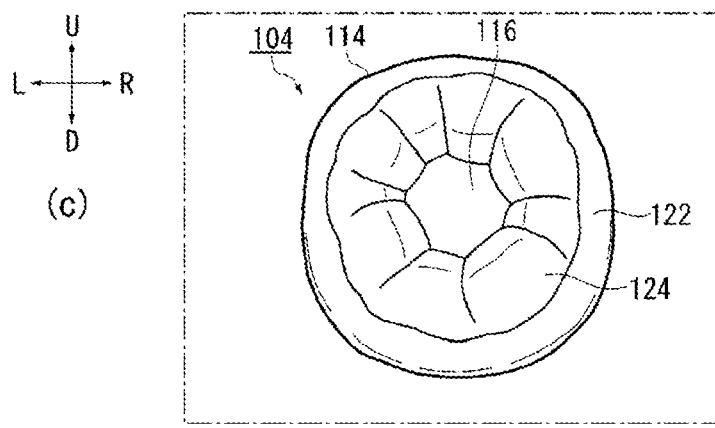

FIGS. 4(a), 4(b) and 4(c) are views illustrating a process in which the cushion 104 in FIG. 3(a) inflates and deploys. The cushion 104 inflates and deploys in the order of FIG. 4(a) to FIG. 4(c). As illustrated in FIG. 4(a), the gas is first supplied to the inner bag 116 and the inner bag 116 inflates and deploys prior to the outer bag 114 in the present embodiment when the inflator 112 (see FIG. 2(b)) operates with shock detection.

As illustrated in FIG. 4(b), the gas is also supplied from the inner bag 116 to the outer bag 114 through the communication hole 118 (see FIG. 2(b)). When the outer bag 114 inflates around the previously inflated inner bag 116, the inside base fabric 124 of the outer bag 114 interferes with the inner bag 116 and protrudes and inflates from the opening part 126 to the seat side so as to be pressed by the inner bag 116.

The opening part 126 (see FIG. 3(c)) of the outside base fabric 122 illustrated in FIG. 4(c) is formed in a round shape when seen from the seat 102 (see FIG. 1(b)), and the inside base fabric 124 inflates roundly along the edge of the opening part 126. Since the inside base fabric 124 inflates along the edge of the opening part 126, the inside base fabric 124 is present at positions slightly deviated to vertical and horizontal sides with respect to a front side when seen from the occupant in a seated state, for example, when the opening part 126 is provided so as to face the occupant sitting in the seat 102.

In the present embodiment, the inside base fabric 124 and other portions of the outer bag 114 such as the outside base fabric 122 are configured to have different tension in the whole cushion 104. Specifically, the inside base fabric 124 on the inside has low tension, while the outside base fabric 122 present on the outside relatively has high tension.

When both portions of the outside base fabric 122 and the inside base fabric 124 of the outer bag 114 during inflation in FIG. 2(b) are seen as curved surfaces, the inside base fabric 124 present on the inside has a smaller approximate curvature radius than the outside base fabric 122 present on the outside. Generally, tension of a base fabric is affected by pressure and a curvature radius. Since the outer bag 114 inflates with the pressure of the gas supplied from the one inflator 112 (see FIG. 2(b)), the inside base fabric 124 has lower tension than the outside base fabric 122 according to the magnitude relationship between their curvature radii. Thus, the outer bag 114 of the present embodiment is so configured that the inside base fabric 124 having lower tension protrudes.

Figure 5:
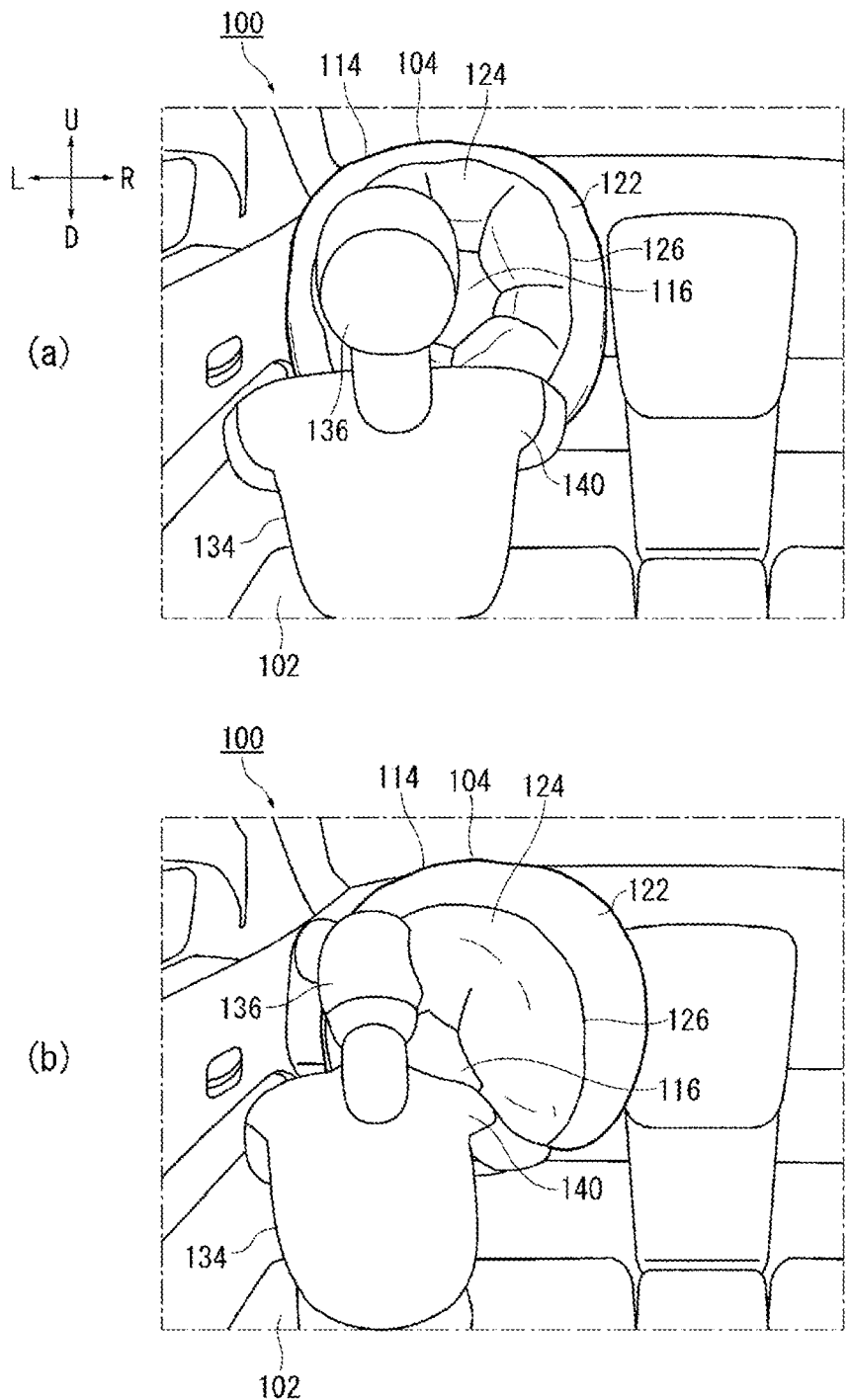
FIGS. 5(a) and 5(b) are views illustrating a process in which the cushion in FIG. 1(b) restrains an occupant.

FIGS. 5(a) and 5(b) are views illustrating a process in which the cushion 104 in FIG. 1(b) restrains an occupant 134. The cushion 104 restrains the occupant 134 in the order of FIG. 5(a) and FIG. 5(b). With the above configurations, the cushion 104 of the present embodiment makes it possible to efficiently reduce an injury value of the occupant 134 a case of emergency.

FIG. 5(a) illustrates a phenomenon assuming an oblique collision when seen from the rear side on the inside of the vehicle. As illustrated in FIG. 5(a), the cushion 104 inflates and deploys on the vehicle front side of the seat 102 when a shock occurs in the vehicle. The outside base fabric 122 of the outer bag 114 has the opening part 126 (see FIG. 3(a)) opened toward the seat 102, and the inside base fabric 124 protrudes and inflates from the opening part 126 toward the seat side.

As illustrated in FIG. 5(b), the occupant 134 enters in an oblique direction (left oblique slightly upper side in FIG. 5(b)) with respect to the cushion 104 in a case of the oblique collision. In the present embodiment, the opening part 126 is provided facing the seat 102, and the inside base fabric 124 inflating along the edge of the opening part 126 is present at the positions slightly deviated to the vertical and horizontal sides with respect to the front side of the seat 102. Therefore, a head 136 of the occupant 134 moving in the oblique direction from the seat 102 comes into contact with the inside base fabric 124. Since the inside base fabric 124 is set to have lower tension than the outside base fabric 122 at this time, the inside base fabric 124 can more softly receive the head 136.

The outer bag 114 restrains a shoulder 140, a breast, or the like of the occupant 134 using not only the inside base fabric 124 but also the outside base fabric 122. Further, the inner bag 116 supports the outer bag 114 from the inside of the opening part 126. By these operations, the cushion 104 can adjust the movements of the head 136, the shoulder 140, or the like of the occupant 134 and minimizes both the rotation of the head 136 turning horizontally with respect to the shoulder 140 and the rotation of the head 136 tilting vertically and horizontally to restrain the occupant 134. Thus, the cushion 104 can remarkably reduce an injury value of the occupant 134.

Figure 6:
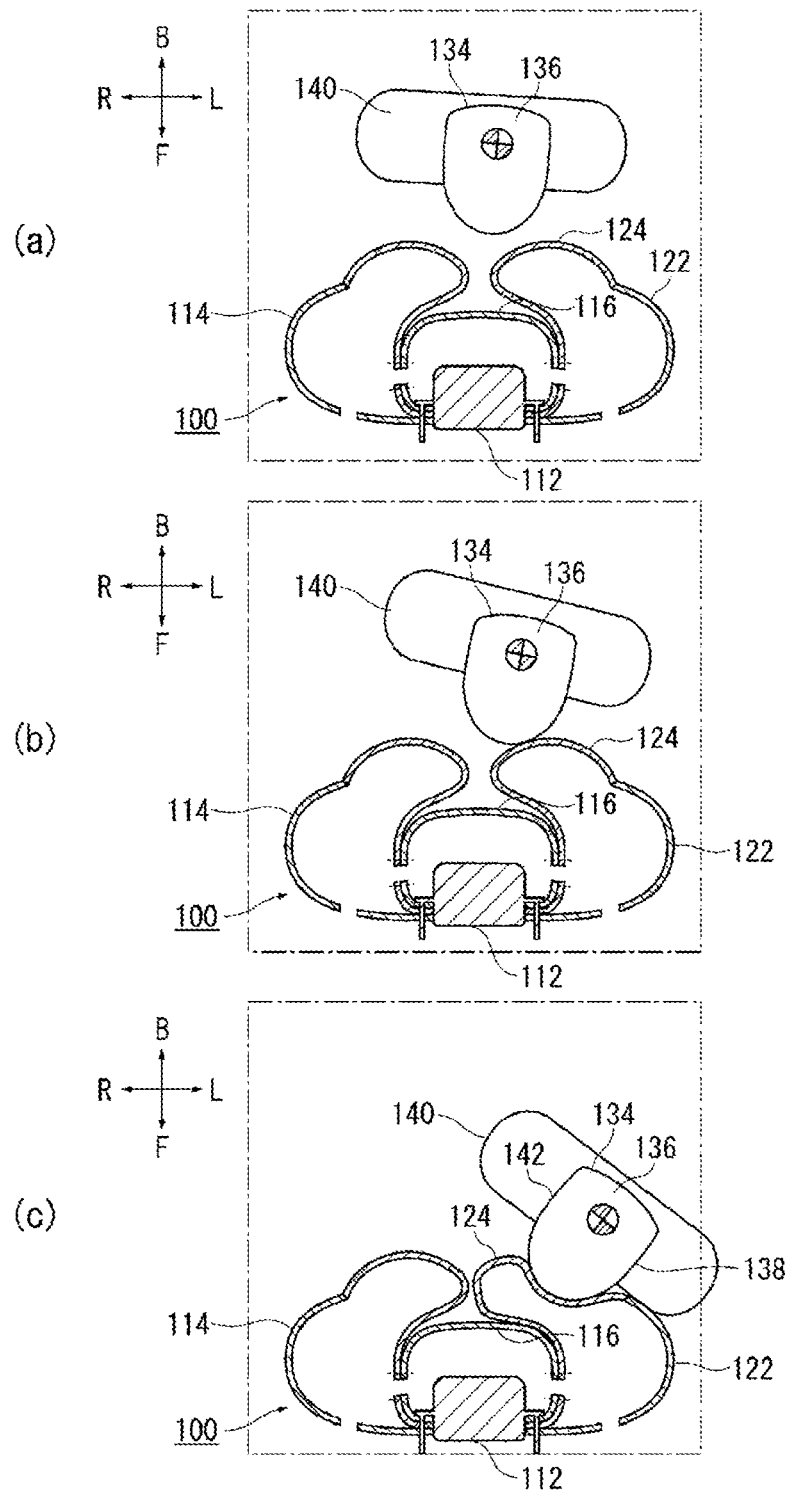
FIGS. 6(a), 6(b) and 6(c) are views illustrating a process in which the cushion in FIG. 2(b) restrains the occupant.

The process of restraining the occupant when seen in a direction different from the direction of FIGS. 5(a) and 5(b) will be described. FIGS. 6(a), 6(b) and 6(c) are views illustrating a process in which the cushion 104 in FIG. 2(b) restrains the occupant 134. In FIGS. 6(a), 6(b) and 6(c), each figure illustrates the cushion 104 and the occupant 134 when seen from above the vehicle. The cushion 104 restrains the occupant 134 in the order of FIG. 6(a) to FIG. 6(c). FIG. 6(a) corresponds to the state of FIG. 5(a). As illustrated in FIG. 6(a), the cushion 104 inflates and deploys on the vehicle front side of the seat 102 (see FIG. 1(b)) when a shock occurs in the vehicle.

FIG. 6(b) illustrates a state immediately after the occupant 134 has come into contact with the outer bag 114. The occupant 134 illustrated in FIG. 6(b) has moved to an oblique front side on the inside of the vehicle (right oblique lower side in FIG. 6(b)) from the state of FIG. 6(a).

The inside base fabric 124 of the outer bag 114 protrudes toward the side of the occupant (upper side in FIG. 6(b)) sitting in the seat 102 and is closer to the occupant 134 than the outside base fabric 122 and the inner bag 116. Accordingly, the inside base fabric 124 comes into contact with the occupant 134 at the earliest stage among the whole cushion 104.

FIG. 6(c) corresponds to the state of FIG. 5(b). FIG. 6(c) is a view in which the occupant 134 in FIG. 6(b) has made an attempt to further move to the oblique front side on the inside of the vehicle (right oblique lower side in FIG. 6(c)). When the occupant 134 comes into contact with the inside base fabric 124, the load is absorbed by the soft inside base fabric 124 having low tension to reduce the further movement of the occupant 134. At this time, the inside base fabric 124 is supported by the inner bag 116 from the central side of the opening part 126. Thus, the head 136 of the occupant 134 is received and restrained in the vicinity of the inside base fabric 124 of the outer bag 114.

As illustrated in FIG. 6(c), the head 136 comes into contact with the inside base fabric 124 up to the vicinities of a left head 138 and a right head 142 since the inside base fabric 124 is relatively soft. Here, assuming that a simple integrated cushion is just present in front of the occupant 134, the head 136 and the shoulder 140 differently move due to the friction between the head 136 and the cushion when the head 136 of the obliquely-moving occupant 134 comes into contact with the cushion, whereby a clockwise rotating force with a neck as an axis when seen from a vehicle upper side with respect to the shoulder 140 or the like (rotating force of the head 136 turning horizontally with its cervical vertebra as an axis) may occur in the head 136. If such rotation occurs in the head 136, an injury value of the occupant 134 is easily increased.

In view of the problem, the present embodiment is so configured that the head 136 of the occupant 134 is caused to come into contact with the inside base fabric 124 having low tension of the outer bag 114 to absorb the load. Thus, the rotation of the head 136 of the occupant 134 with respect to the shoulder 140 is minimized, and the movement of the head 136 is restrained in conjunction with the movement of the shoulder 140. Thus, the rotation of the head 136 of the occupant 134 is remarkably reduced or cancelled and an angular speed of the head 136 is reduced in the present embodiment, whereby an injury value of the occupant 134 with the rotation of the head 136 can be reduced.

According to these configurations of the present embodiment, high occupant restraining performance can be secured and an injury value and the movement of the occupant 134 can be reduced in a case of not only an oblique collision but also a collision in the longitudinal direction of the vehicle.

Note that the above description is given, with reference to FIG. 6(c), of the clockwise rotation as an example of the rotation of the head 136. However, depending on emergency situations, the occupant 134 may move to, for example, an oblique front side on the inside of the vehicle and the head 136 rotates counterclockwise about a neck when seen from above. The cushion 104 of the present embodiment can also reduce or cancel the counterclockwise rotation and reduce an angular speed of the head 136. That is, the airbag device 100 of the present embodiment can produce the same effect for the occupant 134 moving to any side in the vehicle width direction.

In addition, the airbag device 100 is implemented as a frontal airbag for a driver seat in the present embodiment but is installable at a position other than the driver seat. For example, the airbag device 100 is capable of being implemented as a frontal airbag that inflates and deploys in front of a rear seat when provided on the rear side of a front seat.

FIGS. 7(a), 7(b), 7(c) and 7(d) are views illustrating each modified example of the cushion 104 illustrated in FIG. 2. Below, the same constituent elements as those described above will be given the same reference signs to omit their descriptions. In addition, constituent elements having the same names as those described above have the same functions unless otherwise specifically noted even if the constituent elements are given different reference signs.

In an airbag device 100, a protrusion amount of an inside base fabric 124 with respect to an outside base fabric 122 can be changed as the capacity of an inner bag is increased and decreased. Like a cushion 150 of a first modified example illustrated in FIG. 7(a), a prescribed amount of the volume of an outer bag 114 is extruded from an opening part 126 when an inner bag 152 inflates. Thus, the inside base fabric 124 protrudes and inflates from the opening part 126 to the side of a seat (upper side in FIG. 7(a)).

Figure 7:
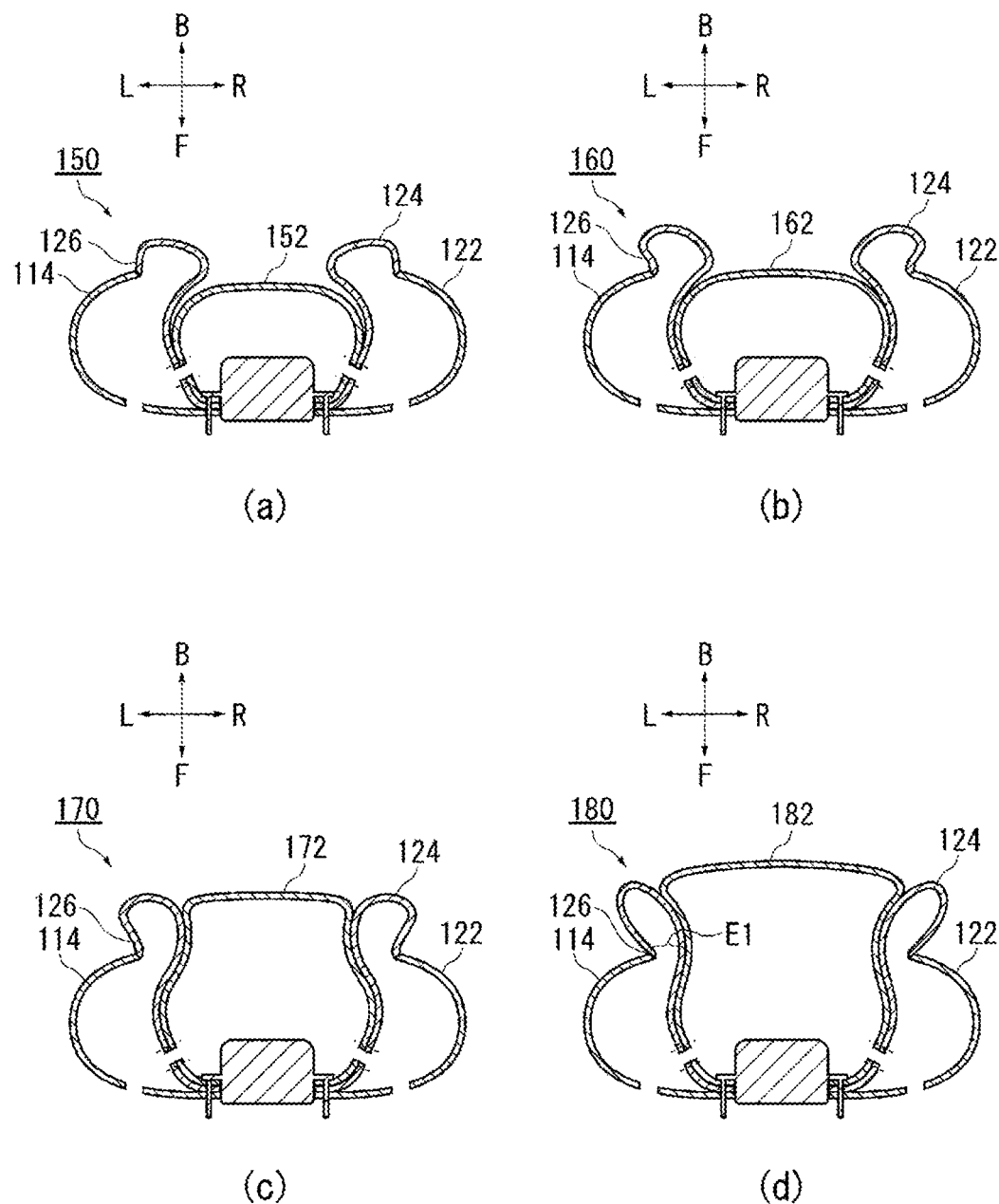
FIGS. 7(a), 7(b), 7(c) and 7(d) are views illustrating each modified example of the cushion illustrated in FIG. 2(b).

In each of the cushions of FIG. 7(b) to FIG. 7(d), the capacity of an inner bag is increased compared with the cushion of FIG. 7(a). Like a cushion 160 of a second modified example illustrated in FIG. 7(b), a volume of an outer bag 114 extruded from an opening part 126 increases and a protrusion amount of an inside base fabric 124 increases as the capacity of an inner bag 162 is increased.

In a cushion 170 of a third modified example in FIG. 7(c), an inner bag 172 is exposed to an outside from an opening part 126, and an inside base fabric 124 is expanded in the radial direction of the opening part 126. In a cushion 180 of a fourth modified example in FIG. 7(d), an inner bag 182 is further largely exposed, and an inside base fabric 124 is also further expanded.

Here, the inside base fabric 124 protrudes from the opening part 126 through a gap E1 from the opening part 126 of the outside base fabric 122 to the inner bag 182. Since a width of the gap E1 is likely to narrow as the capacity of the inner bag is increased, a protrusion amount of the inside base fabric 124 may be reduced when the capacity of the inner bag 182 is increased to a certain degree.

As described above, in the airbag device 100, the inside base fabric 124 is further extruded from the opening part 126 to the side of the seat or a protrusion amount of the inside base fabric 124 is reduced as the capacity of the inner bag is increased and decreased. Like this, an inflation degree of the inside base fabric 124 can be appropriately changed. Thus, it becomes possible to adjust the contact state between the inside base fabric 124 and the occupant.

Figure 8:
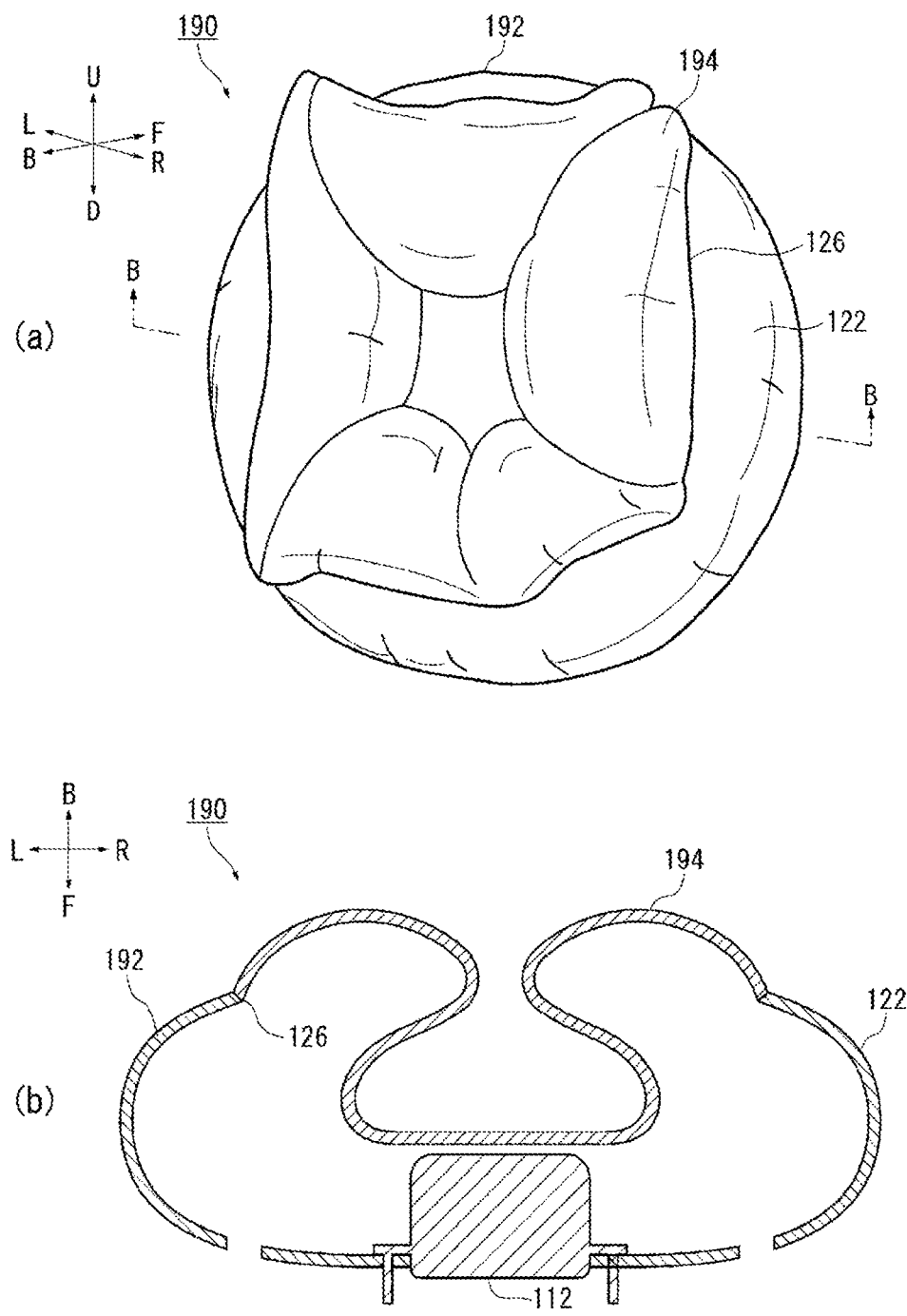

FIGS. 8(a) and 8(b) are views illustrating still another modified example of the cushion 104 illustrated in FIG. 2. FIG. 8(a) is a perspective view of a cushion 190 of a fifth modified example. The configuration of the cushion 190 is different from that of the cushion 104 in that the cushion 190 does not include the inner bag 116 in FIG. 2(a).

FIG. 8(b) is a B-B cross-sectional view of the cushion 190 in FIG. 8(a). Since an inside base fabric 194 forms the inner peripheral surface of an outer bag 192 and is positioned inside a curved surface, the inside base fabric 194 has room in its area during inflation compared with an outside base fabric 122 positioned outside the curved surface. Therefore, even with no inner bag 116 (see FIG. 2(b)), the inside base fabric 194 protrudes so as to make its part overflow from an opening part 126 by inflating with gas. Accordingly, even if the cushion 190 has a configuration that does not include the inner bag 116, it is possible to restrain the occupant with the inside base fabric 194 having low tension.

Figure 9:
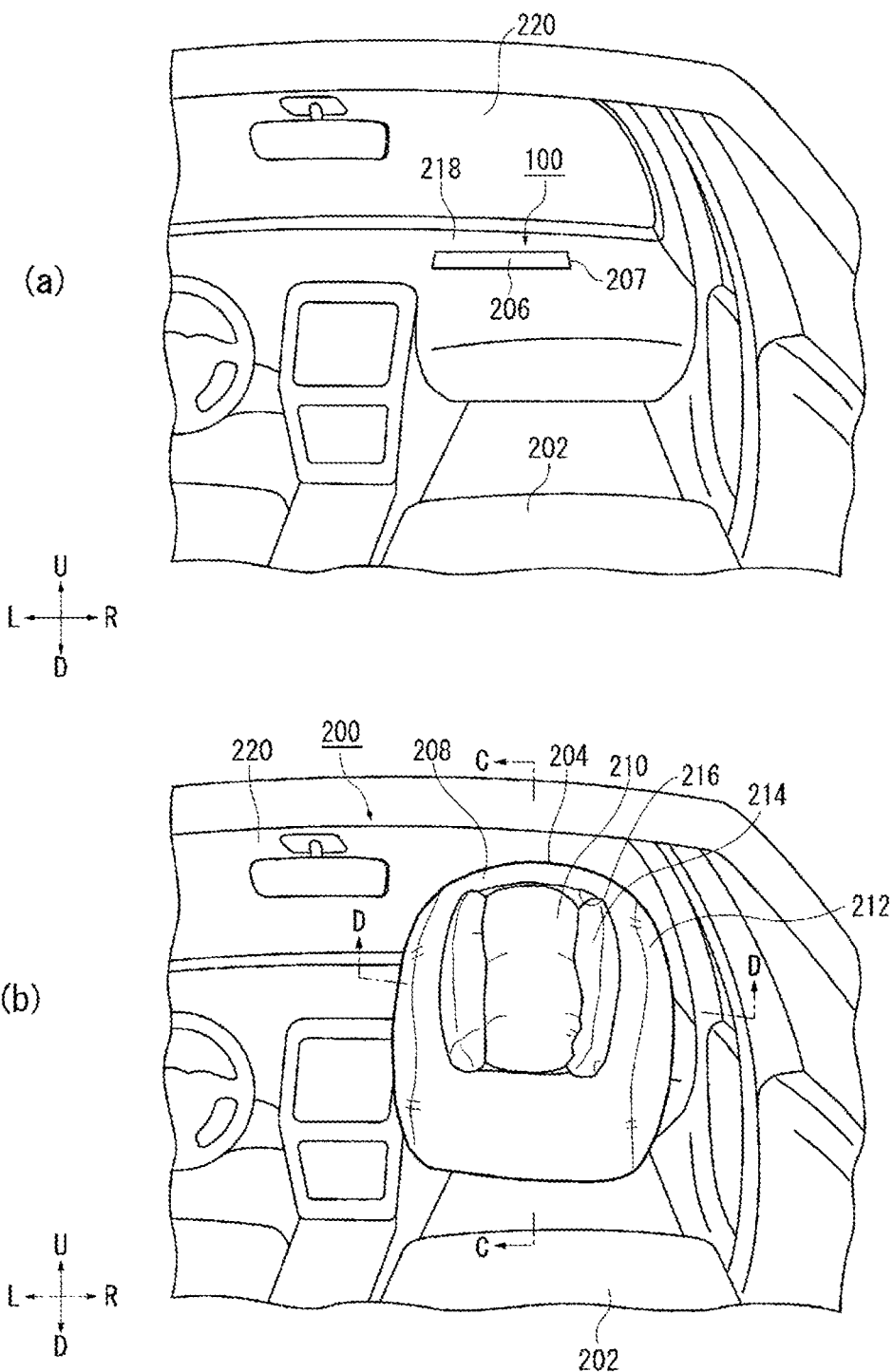
FIGS. 9(a) and 9(b) are views illustrating the outline of an airbag device according to a second embodiment of the present invention.

FIGS. 9(a) and 9(b) are views illustrating the outline of an airbag device 200 according to a second embodiment of the present invention. FIG. 9(a) is a view illustrating a vehicle before the airbag device 200 operates. In the present embodiment, the airbag device 200 is implemented as a passenger bag for a passenger seat (front-right seat 202) in a left-hand steering vehicle. In the following description, the front-right seat 202 will be assumed. Therefore, the outside of the vehicle in a vehicle width direction represents the right side of the vehicle, and the inside of the vehicle in the vehicle width direction represents the left side of the vehicle.

An airbag cushion (hereinafter called a cushion 204 (see FIG. 9(b))) of the airbag device 200 is accommodated in an accommodation part 206 provided on the vehicle front side of the seat 202 in an instrument panel 218 and restrains an occupant on the seat 202 from the vehicle front side. The cushion 204 operates with a shock detection signal transmitted from a sensor not shown and performs the cleavage or the like of a cover portion 207 of the accommodation part 206 with the inflation pressure to inflate and deploy toward a vehicle rear side.

FIG. 9(b) is a view illustrating the vehicle after the airbag device 200 in FIG. 9(a) has operated. The cushion 204 has a bag shape and inflates and deploys with gas supplied from an inflator 112 (see FIG. 10(b)). The cushion 204 is also formed by sewing or bonding a plurality of base fabrics constituting its surface together in an overlapped state, cotton spinning using OPW (One-Piece Woven), or the like.

Figure 10:
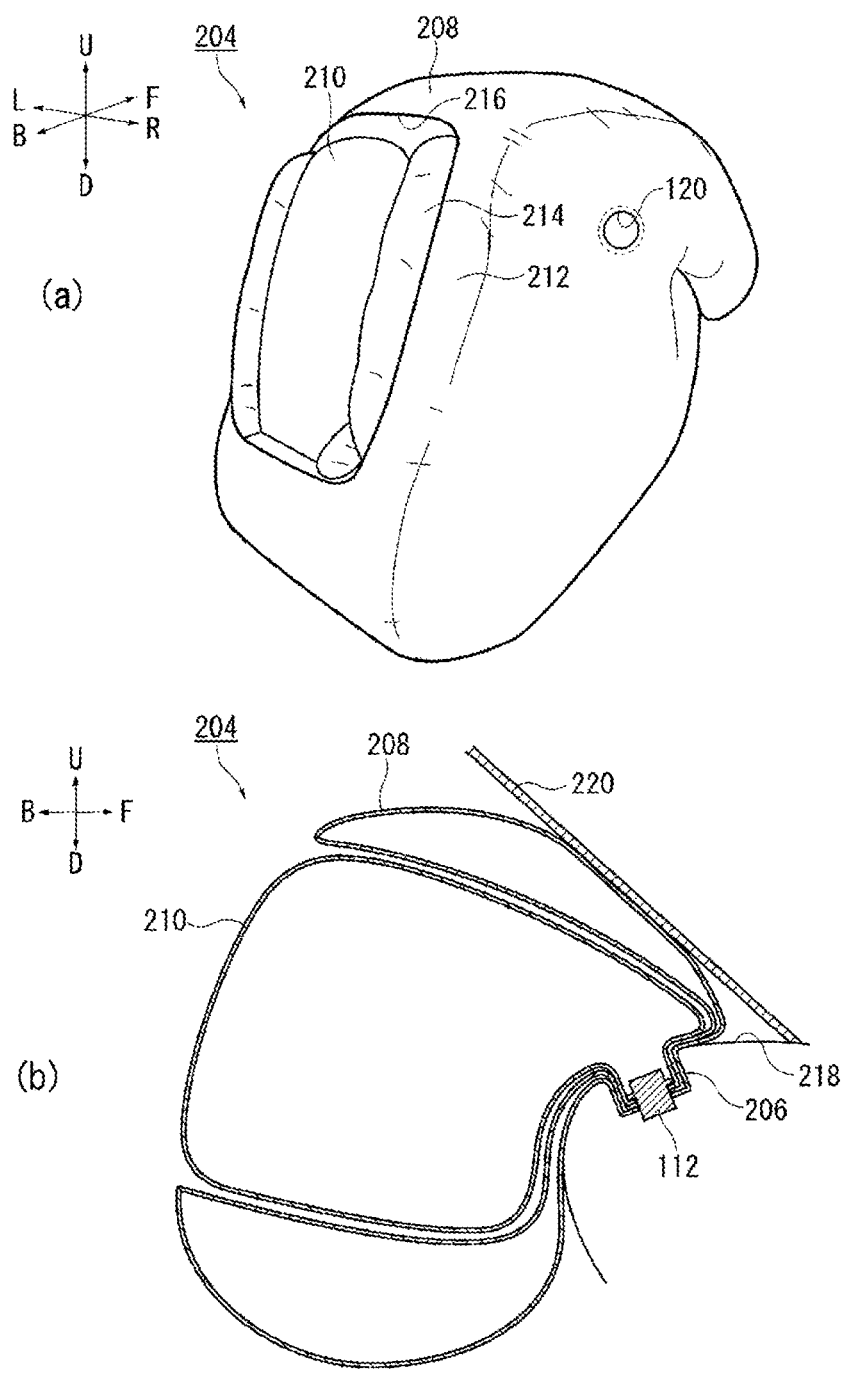
FIGS. 10(a) and 10(b) are views illustrating a cushion during inflation and deployment in FIG. 9(b) from each direction.

FIGS. 19)a) and 10(b) are views illustrating the cushion 204 during inflation and deployment in FIG. 9(b) from each direction. FIG. 10(a) is a perspective view of the cushion 204 in FIG. 9(b) when seen from a side slightly close to the outside of the vehicle. The cushion 204 in the present embodiment roughly includes the two portions of an outer bag 208 on its outside and an inner bag 210 on its inside.

The outer bag 208 is a portion shaping the contour of the cushion 204 other than the inner bag 210 on a central side. With gas from an inflator 112, the outer bag 208 inflates in front of the occupant sitting in the seat 202 (see FIG. 9(b)). Among an outside base fabric 212 and an inside base fabric 214 constituting the outer bag 208, the inside base fabric 214 inflates so as to protrude toward the seat 202. In the present embodiment, an opening part 216 of the outside base fabric 212 is formed in a linear shape similar to a quadrilateral shape, and the inside base fabric 214 linearly inflates along the vertical direction of the vehicle on left and right sides in the vehicle width direction of the opening part 216.

The inner bag 210 is a bag-shaped portion provided on the central side of the cushion 204 and inflates with its periphery surrounded by the outer bag 208. The inner bag 210 also inflates by using the gas from the inflator 112 (see FIG. 10(b)).

FIG. 10(b) is a C-C cross-sectional view of the cushion 204 in FIG. 9(b). The cushion 204 inflates and deploys so as to fill in the space between the occupant on the seat 202 (see FIG. 9(b)) and an instrument panel 218 and a windshield 220. Thus, the occupant is restrained from colliding with the instrument panel 218 or the like. In addition, since the occupant is prevented from colliding with the windshield 220, the occupant is also restrained from being thrown out of the vehicle.

The outer bag 208 has the outside base fabric 212 forming an outer surface on its outside and the inside base fabric 214 forming an inner peripheral surface recessed in a concave shape from the opening part 216 provided on the outside base fabric 212. As illustrated in FIG. 9(b), the opening part 216 is formed in a shape similar to a rectangular shape.

The inner bag 210 is formed in a bag shape independently from the outer bag 208 and inflates in a state of being surrounded by the inside base fabric 214 inside the outer bag 208. A part of the inflator 112 is inserted in the inner bag 210, and the gas is supplied to the outer bag through a communication hole 228 (see FIG. 11(a)) or the like after being supplied from the inflator 112 to the inner bag 210.

Figure 11:
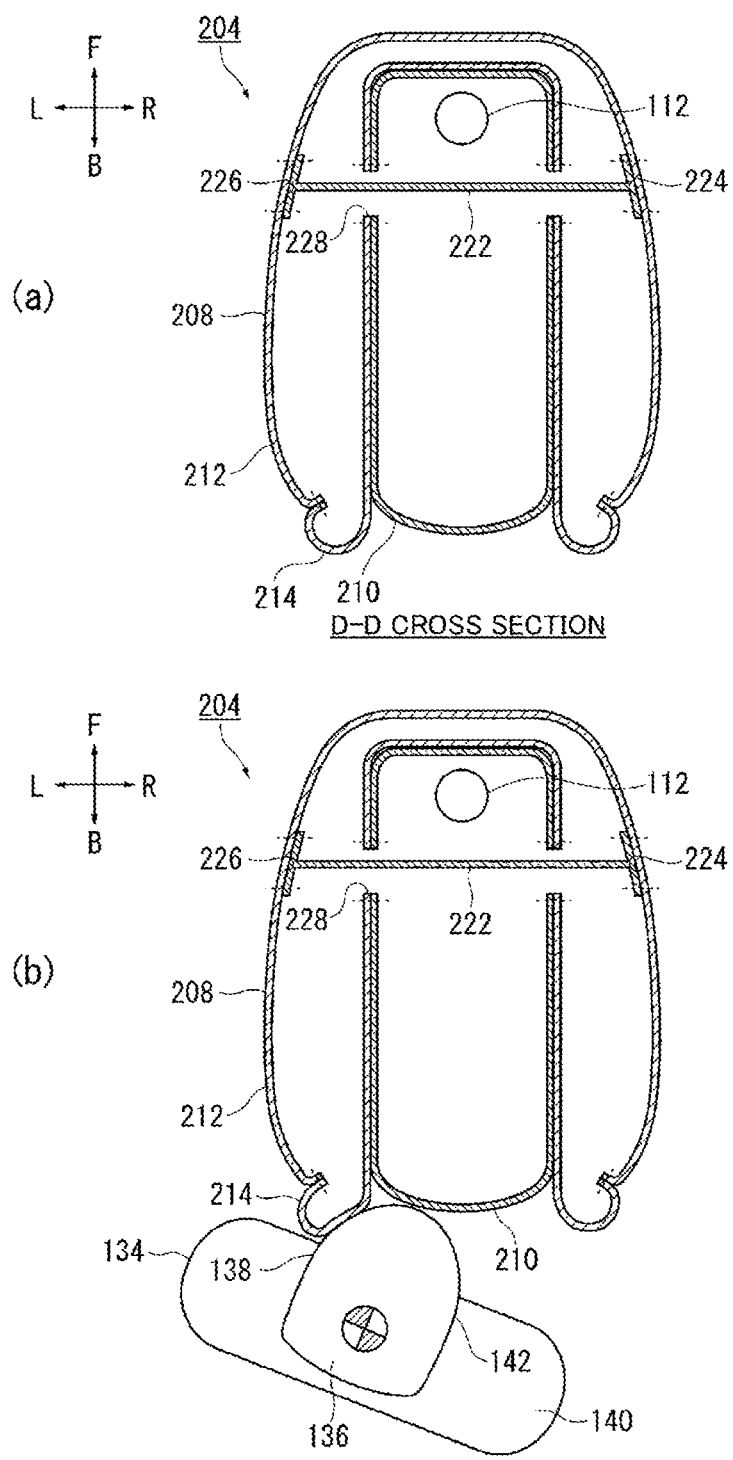
FIGS. 11(a) and 11(b) are cross-sectional views taken along line D-D of the cushion in FIG. 9(b).

FIGS. 11(a) and 11(b) are cross-sectional views of the cushion 204 in FIG. 9(b). As illustrated in FIG. 11(a), the inside base fabric 214 of the outer bag 208 inflates so as to protrude from the opening part 216 toward a seat side (lower side in FIG. 11). The inside base fabric 214 is also set to have lower tension than the outside base fabric 212.

When both the outside base fabric 212 and the inside base fabric 214 of the outer bag 208 during inflation are seen as curved surfaces, the inside base fabric 214 present on the inside has a smaller approximate curvature radius than the outside base fabric 212 present on the outside. Since the outer bag 208 inflates with the pressure of the gas supplied from the one inflator 112, the inside base fabric 214 has lower tension than the outside base fabric 212 according to the magnitude relationship between their curvature radii. Thus, the outer bag 208 of the present embodiment is also so configured that the inside base fabric 214 having lower tension protrudes.

FIG. 11(b) is a view illustrating a state in which the cushion 204 in FIG. 11(a) has restrained an occupant 134. The occupant 134 enters in an oblique direction (left oblique slightly upper side in FIG. 11(b)) with respect to the cushion 204 in a case of an oblique collision. The opening part 216 is provided facing the seat 202 (see FIG. 9(b)), and the inside base fabric 214 inflating along the edge of the opening part 216 is present at positions slightly deviated to a horizontal side in the vehicle width direction with respect to the front side of the seat 202. Accordingly, the occupant 134 comes into contact with the inside base fabric 214 when moving in the oblique direction from the seat 202. Since the inside base fabric 214 is set to have lower tension than the outside base fabric 212 at this time, the inside base fabric 124 can more softly receive the head 136 up to the vicinity of the temporal region of the head 136.

The outer bag 208 restrains a shoulder 140, a breast, or the like of the occupant 134 using not only the inside base fabric 214 but also the outside base fabric 212. Further, the inner bag 210 supports the outer bag 208 from the inside of the opening part 216. By these operations, the cushion 204 can adjust the movements of the head 136, the shoulder 140, or the like of the occupant 134 and minimizes both the rotation of the head 136 turning horizontally with respect to the shoulder 140 and the rotation of the head 136 tilting vertically and horizontally to restrain the occupant 134. Thus, the cushion 204 can remarkably reduce an injury value of the occupant 134.

The airbag device 200 further includes an inner tether 222 inside the outer bag 208. The inner tether 222 is a band-shaped member bridged across inside the outer bag 208 and takes on the responsibility of adjusting the capacity of the gas and the outer shape of the outer bag 208.

Inside the outer bag 208, the inner tether 222 is bridged across in the vehicle width direction so as to connect the two places of one end 224 on the outside of the vehicle and the other end 226 on the inside of the vehicle of the outside base fabric 212 to each other. Further, the inner bag 210 and the inside base fabric 214 are provided with the communication hole 228, and the inner tether 222 passes through the communication hole 228 to be bridged across the inner bag 210 and the inside base fabric 214 in a penetrating state. By the restriction of the shape of the outer bag 208 in the vehicle width direction with the inner tether 222, it becomes possible to perform the adjustment of inflation pressure applied to the base fabrics, the securement of the shape during the restraining of the occupant, or the like.

Figure 12:
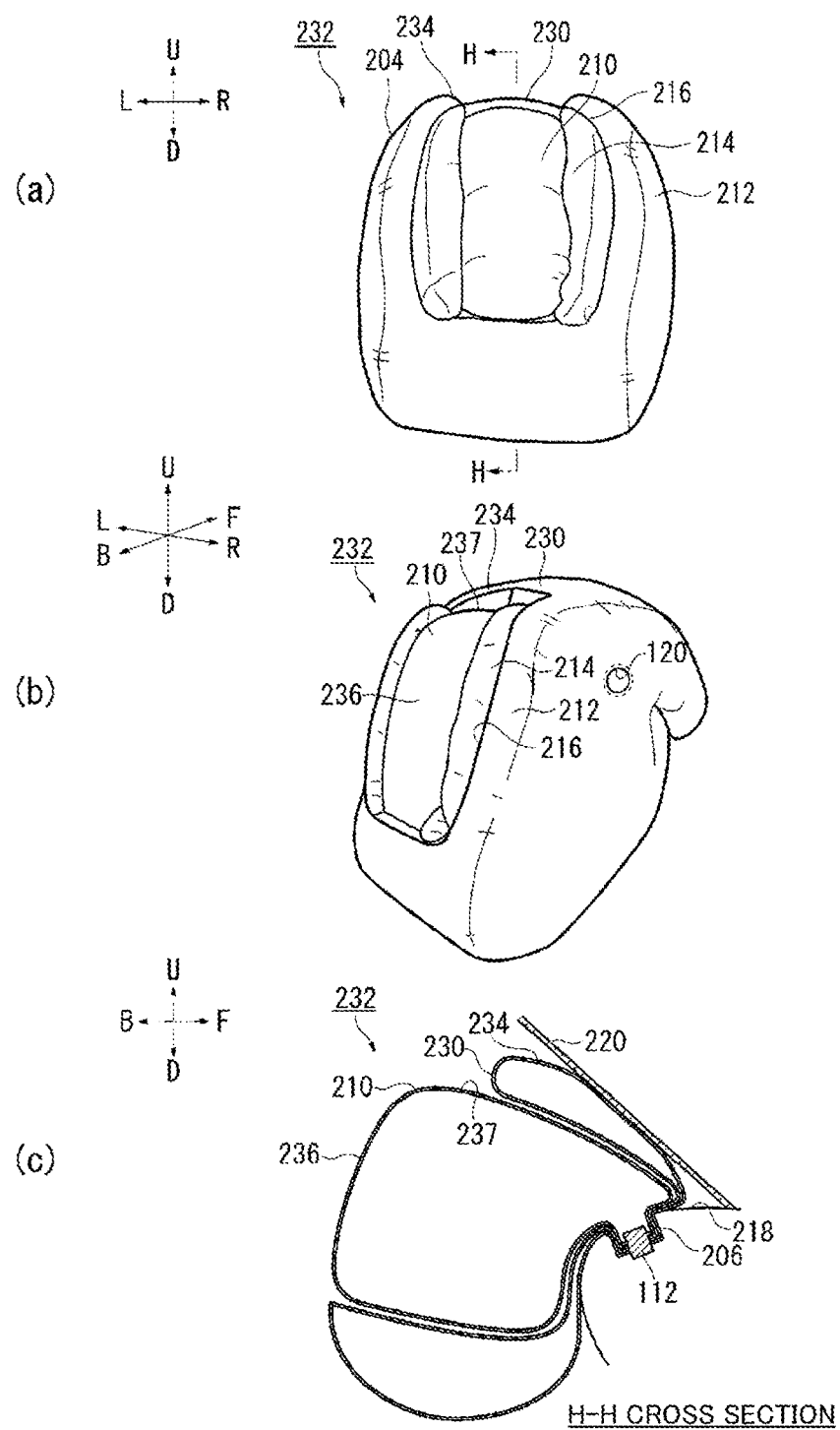

FIGS. 12(a), 12(b) and 12(c) are views of a first modified example of the cushion 204 illustrated in FIG. 9(b) or the like. FIG. 12(a) corresponds to FIG. 9(b) and illustrates a cushion 232 of the first modified example when seen from the vehicle rear side. The cushion 232 is a passenger bag for a passenger seat the same as the cushion 204, but the configuration of the cushion 232 is different from that of the cushion 204 in the shape of an upper portion 230 of an outer bag 234.

FIG. 12(b) corresponds to FIG. 10(a) and is a perspective view of the cushion 232 when seen from a side slightly close to the outside of the vehicle. As illustrated in FIG. 12(b), the upper portion 230 representing a portion above an inner bag 210 in the outer bag 234 is formed in a shape retracted to the vehicle front side (right side in FIG. 12(b)) over the inner bag 210. That is, the upper portion 230 of the outer bag 234 hardly comes into contact with the occupant 134. According to this configuration, the cushion 232 makes it possible to cause the inner bag 210 to widely come into contact with the occupant 134 (see FIG. 13(a)) to restrain the occupant 134 in the vertical direction.

FIG. 12(c) is an H-H cross-sectional view of the cushion 232 in FIG. 12(a). As illustrated in FIG. 12(c), the inner bag 210 is roughly formed of a restraining surface 236 formed on the vehicle rear side and an upper surface 237 extending from the upper part of the restraining surface 236 to the vehicle front side under the assumption that the occupant 134 (see FIG. 13(a)) is restrained. In order to cause the restraining surface 236 to widely come into contact with the occupant, the upper portion 230 is formed in the shape retracted to the vehicle front side over the restraining surface 236 to such a degree that the upper surface 237 is partially exposed.

Figure 13:
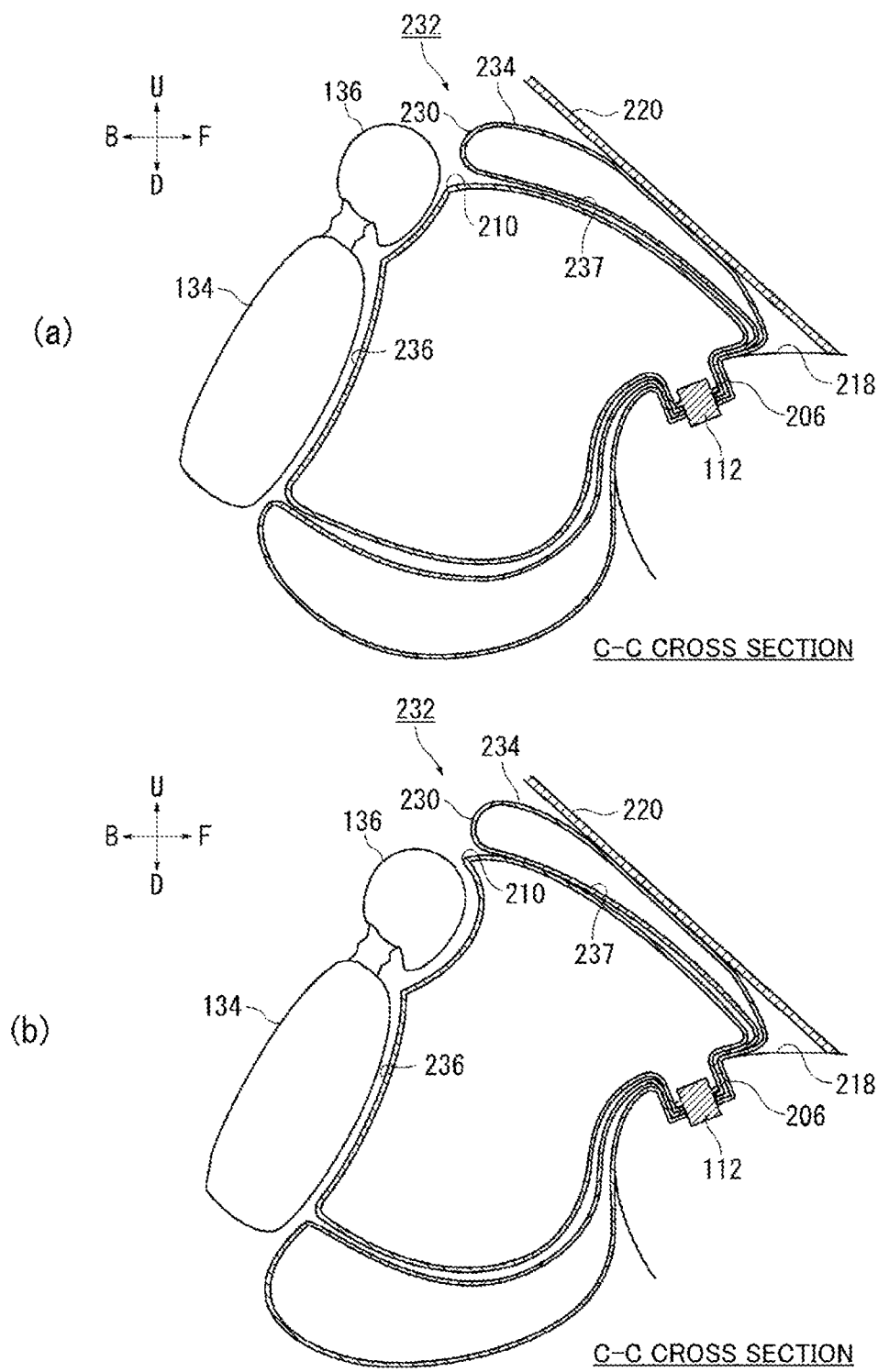
FIGS. 13(a) and 13(b) are views illustrating a process in which the cushion in FIG. 10(b) restrains an occupant.

FIGS. 13(a) and 13(b) are views illustrating a process in which the cushion 204 in FIG. 12(c) restrains the occupant 134. As illustrated in FIG. 13(a), the upper portion 230 does not come into contact with, for example, the head 136 of the occupant 134 since the upper portion 230 is retracted to the vehicle front side over the restraining surface 236 of the inner bag 210.

FIG. 13(b) is a view in which the occupant 134 has moved to the vehicle front side (right side in FIG. 13(b)) over the state of FIG. 13(a). In the present embodiment, the occupant 134 can be restrained by widely using particularly the restraining surface 236 of the inner bag 210 without causing the upper portion 230 of the outer bag 208 to come into contact with the occupant in the vertical direction.

Since the upper portion 230 is a part of the outer bag 208 and is a bag different from the inner bag 210, the upper portion 230 may be different from the inner bag 210 in rigidity, pressure, or the like. For example, when the upper portion 230 comes into contact with the head 136 in a case in which the upper portion 230 has higher rigidity than the inner bag 210, a difference in a restraining force occurs between the head 136 and a breast or the like with which the inner bag 210 comes into contact to cause a local load in the body of the occupant 134. In view of this problem, the inner bag 210 is caused to widely come into contact with the occupant 134 as in the present embodiment, whereby the occupant 134 can be efficiently restrained with a reduced injury value, compared with a case in which the inner bag 210 and the outer bag 208 are caused to separately come into contact with each region of the body of the occupant 134.

Figure 14:
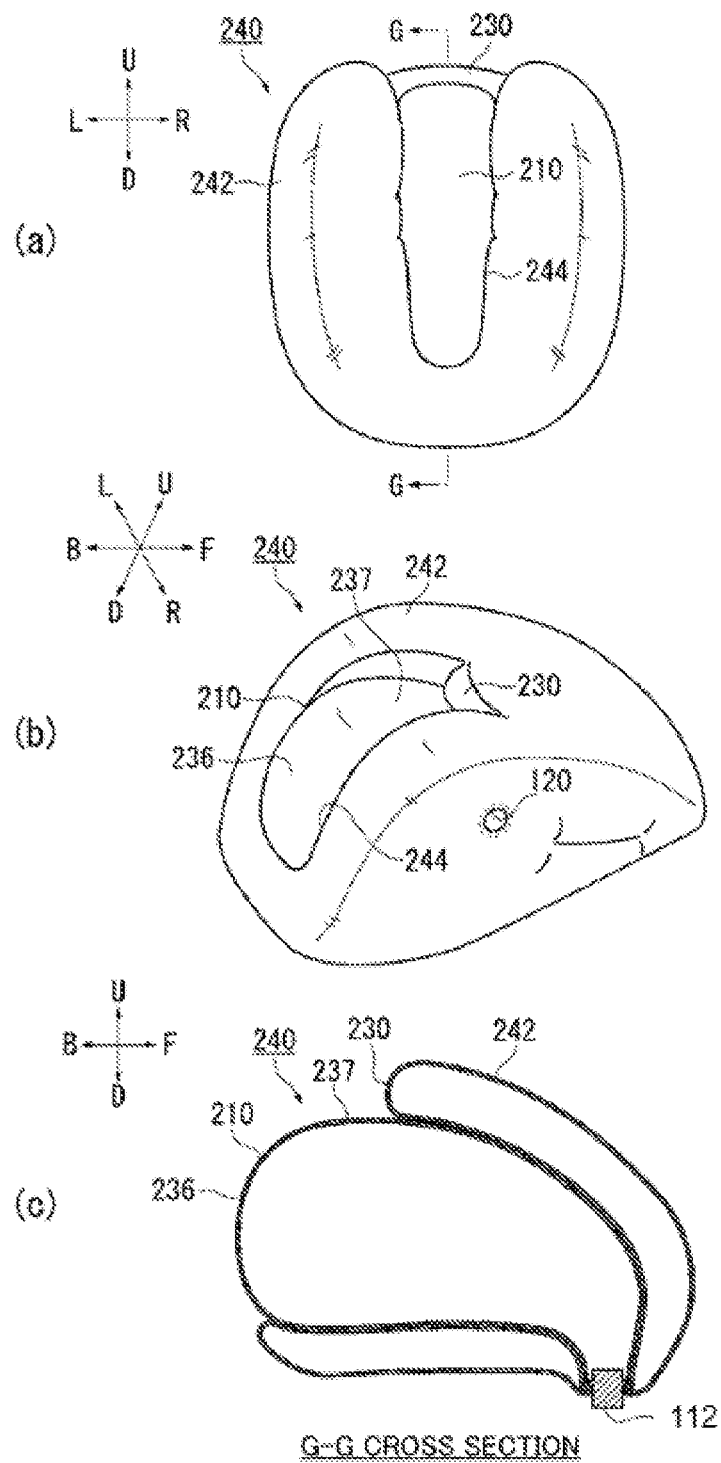

FIGS. 14(a), 14(b) and 14(c) are views of a second modified example of the cushion 204 illustrated in FIG. 9(b) or the like. FIG. 14(a) corresponds to FIG. 9(b) and illustrates a cushion 240 when seen from the vehicle rear side. The cushion 240 is formed in a shape in which an upper portion 230 of an outer bag 242 is retracted to the vehicle front side over an inner bag 210 like the cushion 232, but the configuration of the cushion 240 is different from that of the cushion 232 in that the cushion 240 does not have the protruding inside base fabric 214.

The configuration of the outer bag 242 of the cushion 240 is almost the same as that of the outer bag 234 except that the inside base fabric 214 does not protrude (see FIG. 12(b) or the like). The outer bag 242 has a concave part 244 recessed in a concave shape to provide the inner bag 210 in front of the occupant, i.e., at its center on the vehicle rear side. The inner bag 210 is provided inside the concave part 244 of the outer bag 242 and inflates in a state of being surrounded by the outer bag 242. An inflator 112 (see FIG. 14(c)) is provided inside the inner bag 210, and the outer bag 242 receives gas from the inner bag 210 through a communication hole 228 (see FIG. 11(a)) or the like.

FIG. 14(b) is a perspective view of the cushion 240 in FIG. 14(a) when seen from above on a right side in the vehicle width direction. Like the cushion 232 in FIG. 12(b), the cushion 242 is also formed in the shape in which the upper portion 230 above the inner bag 210 of the outer bag 240 is retracted to the vehicle front side over the restraining surface 236 of the inner bag 210.

FIG. 14(c) is a G-G cross-sectional view of the cushion 240 in FIG. 14(a). As illustrated in FIG. 14(c), the upper portion 230 does not come into contact with, for example, the head 136 (see FIG. 13(a)) of the occupant 134 since the upper portion 230 is retracted to the vehicle front side over the restraining surface 236 of the inner bag 210. Accordingly, in the cushion 240 the inner bag 210 is also caused to widely come into contact with the occupant 134 like the cushion 204, whereby the occupant 134 can be efficiently restrained with a reduced injury value, compared with a case in which the inner bag 210 and the outer bag 208 are caused to separately come into contact with each region of the body of the occupant 134.

Figure 15:
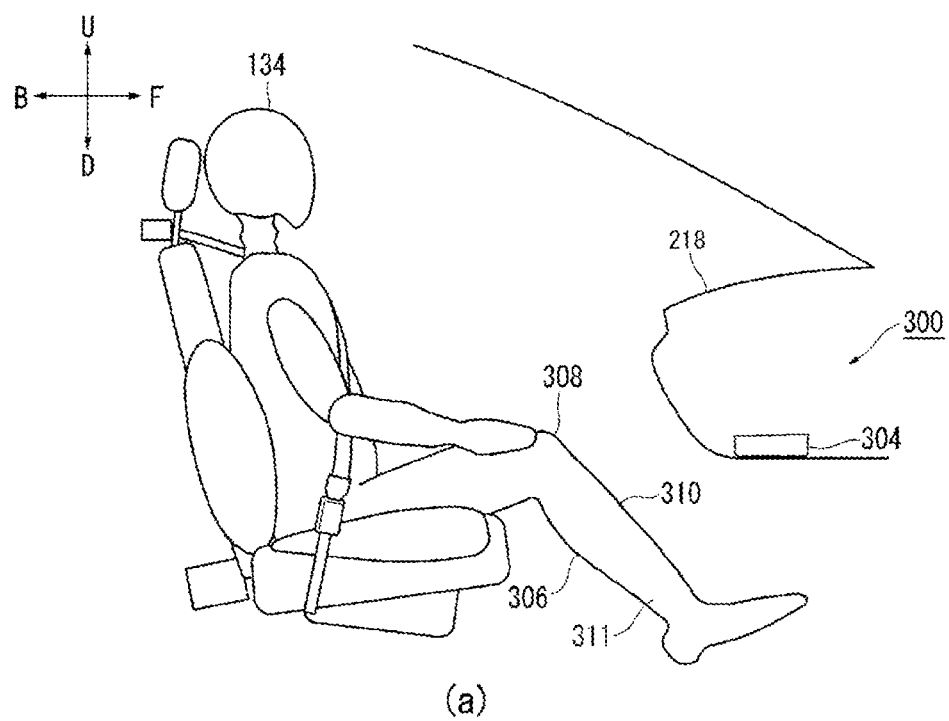
FIGS. 15(a) and 15(b) are views illustrating the outline of an airbag device according to a third embodiment of the present invention.
Figure 15:
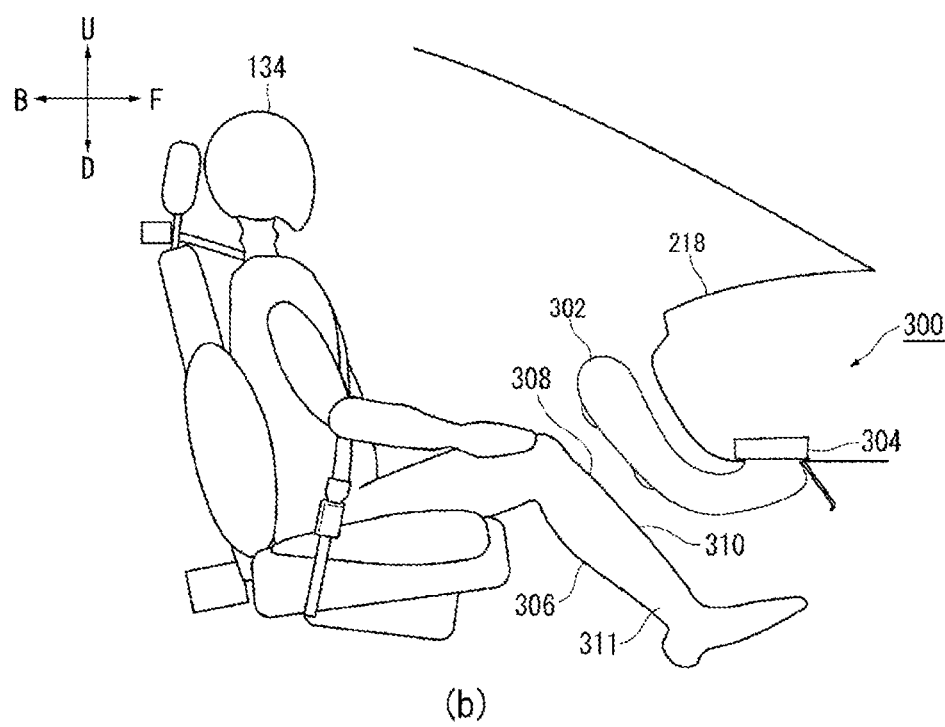

FIGS. 15(a) and 15(b) are views illustrating the outline of an airbag device 300 according to a third embodiment of the present invention. FIG. 15(a) is a view illustrating the state of the airbag device 300 before operation when seen from its right side in a vehicle width direction. In the present embodiment, the airbag device 300 is implemented as a knee airbag for a passenger seat (front-right seat 202) in a left-hand steering vehicle.

A housing 304 that accommodates and supports an airbag cushion (cushion 302 in FIG. 15(b)) of the airbag device 300 is a box-shaped member, provided on the lower side of an instrument panel 218, and has its opening side directed to a vehicle lower side.

FIG. 15(b) is a view illustrating the state of the airbag device 300 during operation in FIG. 15(a). When the airbag device 300 operates, the cushion 302 inflates and deploys from the housing 304 to a vehicle front side in the vicinity of a region from a knee 308 to a cnemis 310 of a leg 306 of an occupant 134. By the cushion 302, the leg 306 moving to the vehicle front side can be prevented from coming into contact with the instrument panel 218.

The cushion 302 is formed in a bag shape by sewing or bonding a plurality of base fabrics constituting its surface together in an overlapped state, cotton spinning using OPW (One-Piece Woven), or the like. An inflator 312 (see FIG. 17(b)) that supplies gas to the cushion 302 is also provided inside the housing 304, and the cushion 302 inflates and deploys with the gas from the inflator 312. In the present embodiment, a cylinder type is used as the inflator 312.

Figure 16:
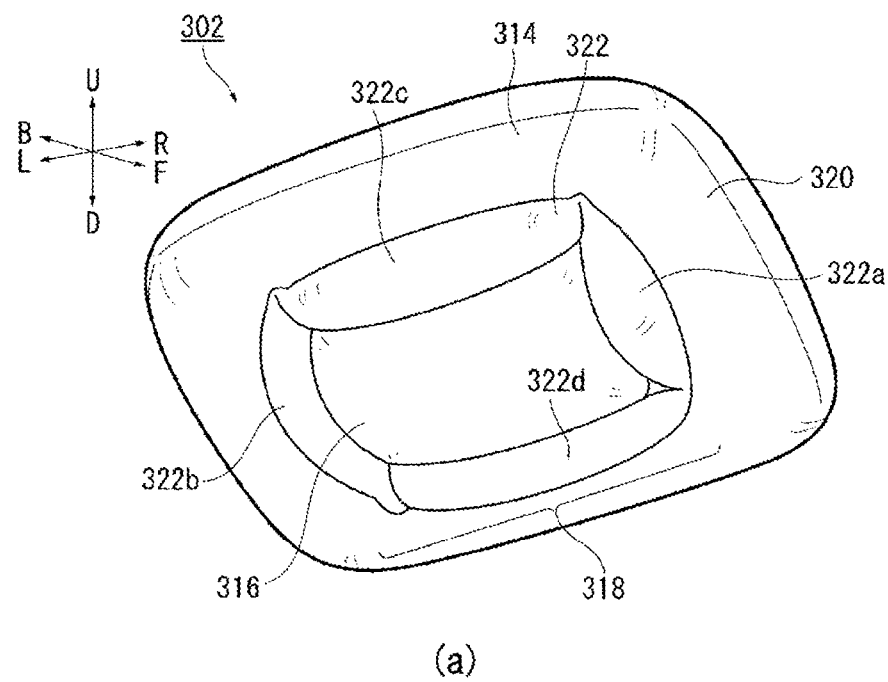
FIGS. 16(a) and 16(b) are views illustrating a cushion during inflation and deployment in FIG. 15(b) from each direction.
Figure 16:
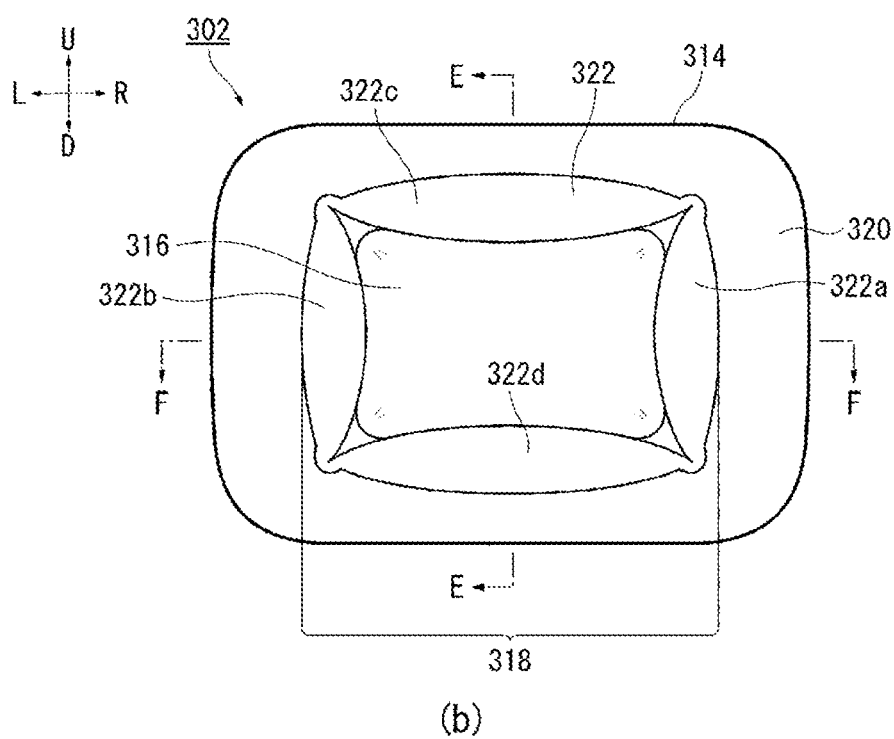

FIGS. 16(a) and 16(b) are views illustrating the cushion 302 during inflation and deployment in FIG. 15(b) from each direction. FIG. 16(a) is a perspective view of the cushion 302 in FIG. 15(b) when seen from its lower side in the vehicle width direction. The cushion 302 in the present embodiment also roughly includes the two portions of an outer bag 314 on its outside and an inner bag 316 on its inside.

The outer bag 314 is a portion shaping the contour of the cushion 302 other than the inner bag 316 on a central side. The outer bag 314 has an opening part 318 on its surface facing the occupant and causes the inner bag 316 provided on the inside to be exposed. The outer bag 314 also has an outside base fabric 320 on its outside and an inside base fabric 322 on its inside with the opening part 318 as a boundary. Further, the inside base fabric 322 inflates so as to protrude toward particularly the leg 306 of the occupant 134 sitting in a seat 202.

The inner bag 316 is a bag-shaped portion provided on the central side of the cushion 302 and inflates with its periphery surrounded by the outer bag 314. The inside base fabric 322 of the outer bag 314 is also configured to protrude toward the occupant when the inner bag 316 inflates inside the opening 318.

FIG. 16(b) is a view illustrating the cushion 302 in FIG. 16(a) when seen from a direction facing the opening part 318. The outer bag 314 is formed in a rectangular shape long in the vehicle width direction, and the opening part 318 is also formed in a rectangular shape with its long sides extending in the vehicle width direction. Further, each of portions (an inside base fabric 322a on its right side and an inside base fabric 322b on its left side) along the short sides of the opening 318 and portions (an inside base fabric 322c on its upper side and an inside base fabric 322d on its lower side) along the long sides of the opening part 318 of the inside base fabric 322 inflates.

When both the outside base fabric 320 and the inside base fabric 322 of the outer bag 314 during inflation are also seen as curved surfaces, the inside base fabric 322 present on the inside has a smaller approximate curvature radius than the outside base fabric 320 present on the outside. Since the outer bag 314 inflates with the pressure of the gas supplied from the one inflator 312 (see FIG. 17(b)), the inside base fabric 322 has lower tension than the outside base fabric 320 according to the magnitude relationship between their curvature radii. Thus, the outer bag 314 of the present embodiment is also so configured that the inside base fabric 322 having lower tension protrudes.

Figure 17:
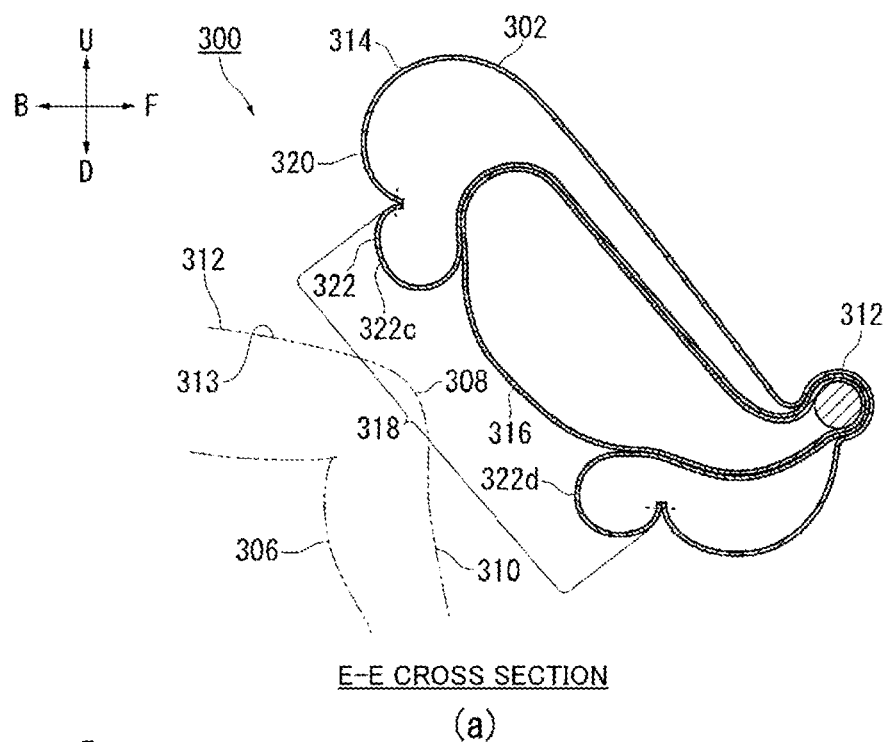
FIGS. 17(a) and 17(b) are cross-sectional views illustrating the cushion in FIG. 16(b) from each direction.
Figure 17:
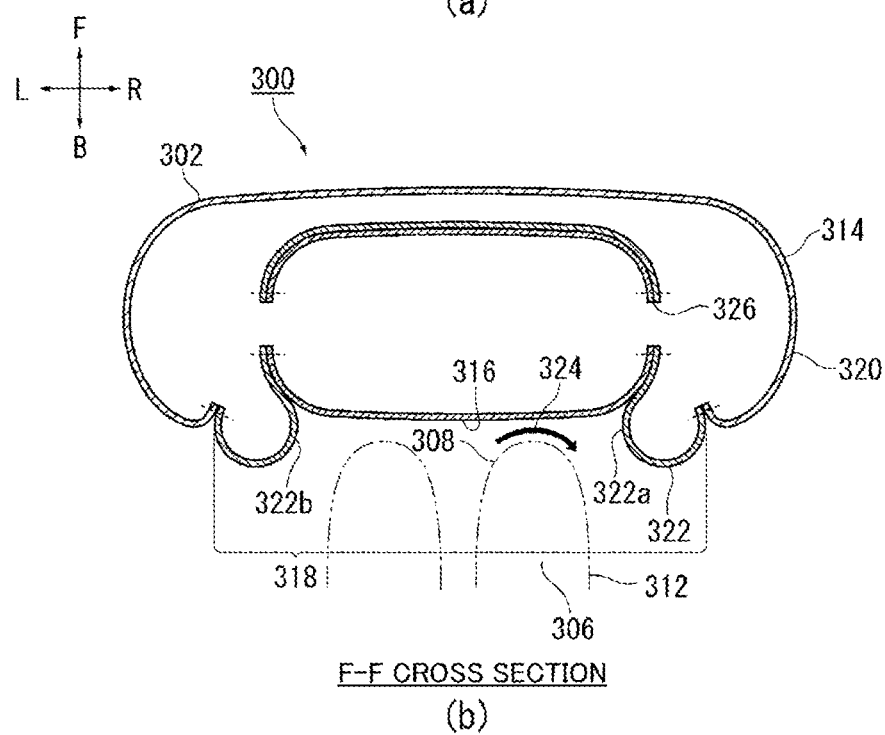

FIGS. 17(a) and 17(b) are cross-sectional views illustrating the cushion 302 in FIG. 16(b) from each direction. FIG. 17(a) is an E-E cross-sectional view of the cushion 302 in FIG. 16(b) and virtually illustrates the leg 306 of the occupant 134 when seen from a vehicle right side.

In a case of emergency, for example, when the vehicle front side comes into contact with an obstacle, the dash panel (not shown) or the instrument panel 218 (see FIG. 15(a)) of the vehicle tends to move to a vehicle rear side while the occupant 134 tends to move to the vehicle front side through inertia. At this time, since the leg 306 of the occupant 134 may cause moment 324 to rotate in the vehicle width direction about the knee 308 or an ankle 311 (see FIG. 15(a)) besides coming into contact with the instrument panel 218, an injury value of the leg 306 is easily increased. In view of this problem, in the present embodiment, the opening part 318 is provided on the vehicle front side of the knee 308 of the occupant 134, and the leg 306 is received in such a way as to cause the knee 308 to enter the opening 318.

The inner bag 316 is directly connected to the inflator 312 and directly receives the gas from the inflator 312. In the present embodiment, the cushion 302 is partitioned into the inner bag 316 and the outer bag 314, and the gas is first caused to flow into the inner bag 316 to promptly inflate and deploy the inner bag 316 in front of the knee. The inner bag 316 has smaller capacity for the gas and can more quickly complete its inflation and deployment compared with a case in which the cushion 302 is an integrated bag-shaped portion. Accordingly, the inner bag 316 makes it possible to initially restrain the occupant 134 at an earlier stage and can receive the knee 308 before the knee 308 comes into contact with the instrument panel 218 even if the knee 308 is present near the instrument panel 218 (see FIG. 15(a)). In addition, since an output required for the inflator 312 to achieve the initial restraining of the occupant 134 reduces, it becomes also possible to cut down costs with an inexpensive inflator having a low output.

FIG. 17(b) is an F-F cross-sectional view of FIG. 16(b) and virtually also shows the leg 306 of the occupant 134 when seen from above the vehicle. The leg 306 may cause the moment 324 to rotate in the vehicle width direction even if the knee 308 is received by the inner bag 316 from its front side. The moment 324 tends to increase an injury value of the leg 306. In view of the problem, it becomes possible to softly restrain the leg 306 in the vehicle width direction not only with the inner bag 316 but also with the inside base fabric 322 in the present embodiment. Thus, the occurrence of the moment 324 is reduced, and an injury value of the leg 306 can be more decreased.

In the present embodiment, the inner bag 316 is provided with a communication hole 326 (inner vent), and the gas is supplied from the inner bag 316 to the outer bag 314 through the communication hole 326. Accordingly, the gas flows into the outer bag 314 when the inner bag 316 is pressed by the knee 308, and the pressure inside the outer bag 314 increases. Thus, the outer bag 314 can more efficiently prevent the movement of the leg 306 in the vehicle width direction. The number of the provided communication holes 326 can be appropriately determined, and the acceleration of the inflation and deployment of the outer bag 314 or the like is, for example, made possible with an increase in the number of the communication holes 326.

As illustrated in FIG. 17(a), the inside base fabrics 322c and 322d protrude also from both sides in the vertical direction of the vehicle through the opening part 318. The inside base fabrics 322c and 322d restrain the leg 306 entering the inner bag 316 so as to softly receive each of the vicinities of a thigh 313 and the cnemis 310. Thus, the leg 306 is more softly received and can be prevented from coming into contact with the instrument panel 218 (see FIG. 15(b)).

Note that a protrusion amount and rigidity during inflation of each part of the inside base fabric 322 (see FIG. 16(b)) can be appropriately set by the adjustment of the shape of the opening part 318. In addition, the rigidity of the inside base fabrics is mainly associated with their curvature radii, and it is also possible to provide higher rigidity in the inside base fabrics 322a and 322b on the right and left sides and provide lower rigidity in the inside base fabrics 322c and 322d on the upper and lower sides. Moreover, an inner tether 222 (see FIG. 11(a)) can be bridged across inside the outer bag 314 through the communication hole 326 in the present embodiment as well. With the inner tether 222, it becomes possible to restrict the shape of the outer bag 314 to adjust inflation pressure applied to the base fabrics or secure the shape of the outer bag 314 during the restraining of the occupant.

The preferred examples of the present invention are described above with reference to the accompanying drawings. However, the above embodiments are preferred examples of the present invention, and modes other than the above embodiments can also be implemented or performed in various ways. The present invention is not restricted to the shapes, sizes, configuration arrangements, or the like of detailed components shown in the accompanying drawings unless otherwise particularly limited to the specification of the present application. In addition, the expressions and the terms used in the specification of the present application are given for illustration purposes and are not limited thereto unless otherwise specifically noted.

Accordingly, it is apparent that persons skilled in the art will conceive various modified examples or corrected examples within the scope of the present invention, and it is understood that such modified examples or corrected examples belong to the technical scope of the present invention as a matter of course.

While the above description constitutes the preferred embodiment of the present invention, it will be appreciated that the invention is susceptible to modification, variation and change without departing from the proper scope and fair meaning of the accompanying claims.

The invention claimed is:

1. An airbag device for an occupant of a seat of a vehicle comprising:

an inflator that is provided in the vehicle and capable of supplying an inflation gas; and an outer bag that inflates, by using the gas, in a prescribed shape in front of the occupant sitting in the seat of the vehicle, wherein the outer bag includes;

an outside base fabric forming an outer surface thereof, an opening part provided in a prescribed area of the outside base fabric, and an inside base fabric forming an inner peripheral surface thereof recessed in a concave shape from the opening part and inflating so as to protrude partially from the opening part, wherein the inside base fabric has lower tension than the outside base fabric upon inflation by the gas for restraint of the occupant, wherein an inner bag is provided inside the outer bag so as to be surrounded by the inside base fabric and inflates in a bag shape independently from the outer bag, wherein a communication hole is provided on the inner bag and causes the gas received by the inner bag from the inflator to be discharged therethrough, and wherein the outer bag is connected to the communication hole and inflates using the gas received through the communication hole.

2. The airbag device according to claim 1, further comprising, a protrusion amount of the inside base fabric with respect to the outside base fabric is changeable according to a capacity of the inner bag.

3. The airbag device according to claim 1, further comprising, a band-shaped inner tether that is bridged across at least two places of the outside base fabric inside the outer bag in a state of penetrating the inside base fabric and the inner bag.

4. The airbag device according to claim 1, further comprising, the outer bag and the inner bag form a driver airbag, and the inner bag and the inside base fabric are provided to restrain a head of the occupant.

5. The airbag device according to claim 1, further comprising, the outer bag and the inner bag form a passenger airbag, and the inner bag and the inside base fabric are provided to restrain a head of the occupant.

6. The airbag device according to claim 1, further comprising, the outer bag and the inner bag form a knee airbag, and the inner bag and the inside base fabric are provided to restrain a knee of the occupant.

7. The airbag device according to claim 6, further comprising, the opening part is formed in a rectangular shape having long sides thereof extending in a vehicle width direction, and the inside base fabric inflates along short sides of the opening part.

8. The airbag device according to claim 1, further comprising, the inner bag is caused to inflate before the outer airbag is caused to inflate upon the inflator supplying the inflation gas.

9. The airbag device according to claim 1, further comprising, upon inflation of the airbag device the outer bag and the inner bag are positioned at approximately the same distance from the occupant.

10. The airbag device according to claim 1, further comprising, upon inflation of the airbag device the inner bag is positioned closer to the occupant than the outer bag.

11. An airbag device for an occupant of a seat of a vehicle comprising:

an inflator that is provided in the vehicle and capable of supplying an inflation gas; and an outer bag that inflates, by using the gas, in a prescribed shape in front of the occupant sitting in the seat of the vehicle, wherein the outer bag includes;

an outside base fabric forming an outer surface thereof, an opening part provided in a prescribed area of the outside base fabric, and an inside base fabric forming an inner peripheral surface thereof recessed in a concave shape from the opening part and inflating so as to protrude partially from the opening part, wherein the inside base fabric has lower tension than the outside base fabric upon inflation by the gas for restraint of the occupant, wherein the outside base fabric is formed from a first outside base fabric and a second outside base fabric joined together at an outer perimeter thereof and the second outside base fabric defining the opening part and the first outside base fabric defining a penetration hole for receiving the inflation gas, and wherein the inside base fabric is formed from a first inside base fabric and a second inside base fabric joined together at an outer perimeter thereof, and the second inside base fabric joined to the second outside base fabric defining the opening part and the first inside base fabric joined to the first outside base fabric to define the penetration hole.

12. An airbag device for an occupant of a seat of a vehicle comprising:

an inflator that is provided in the vehicle and capable of supplying an inflation gas; and an outer bag that inflates, by using the gas, in a prescribed shape in front of the occupant sitting in the seat of the vehicle, wherein the outer bag includes;

an outside base fabric forming an outer surface thereof, an opening part provided in a prescribed area of the outside base fabric, and an inside base fabric forming an inner peripheral surface thereof recessed in a concave shape from the opening part and inflating so as to protrude partially from the opening part, wherein the inside base fabric has lower tension than the outside base fabric upon inflation by the gas for restraint of the occupant, wherein an inner bag is provided inside the outer bag so as to be surrounded by the inside base fabric and inflates in a bag shape independently from the outer bag, and wherein, upon inflation of the airbag device, the outer bag is positioned closer to the occupant than the inner bag.

* * * * *